(12) United States Patent
Roberts et al.

(10) Patent No.: US 6,476,930 B1
(45) Date of Patent: Nov. 5, 2002

(54) OUTPUT PROCESSING AND MERGING OF HYBRID ELECTRONIC DOCUMENTS

(75) Inventors: Gareth S. Roberts, San Jose, CA (US); Tetsuro Motoyama, Cupertino, CA (US)

(73) Assignees: Ricoh Corporation, San Jose, CA (US); Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/205,166

(22) Filed: Dec. 4, 1998

(51) Int. Cl.$^7$ ................................................. G06K 1/00
(52) U.S. Cl. ..................................... 358/1.18; 358/1.13
(58) Field of Search ............................. 358/1.13, 1.18, 358/1.1, 1.15, 1.16, 1.17, 1.14, 401, 403, 449, 462; 345/433; 707/517, 522, 525; 382/305, 306

(56) References Cited

U.S. PATENT DOCUMENTS

| | | | |
|---|---|---|---|
| 5,182,548 A | 1/1993 | Haeberli | 340/706 |
| 5,303,336 A | 4/1994 | Kageyama et al. | 395/114 |
| 5,319,748 A | 6/1994 | Motoyama et al. | |
| 5,353,388 A | 10/1994 | Motoyama et al. | |
| 5,422,992 A | 6/1995 | Motoyama et al. | |
| 5,499,329 A | 3/1996 | Motoyama et al. | |
| 5,504,891 A | 4/1996 | Motoyama et al. | 395/600 |
| 5,506,985 A | 4/1996 | Motoyama et al. | 395/600 |
| 5,513,013 A | 4/1996 | Kuo | 358/448 |
| 5,841,548 A | 11/1998 | Mitome et al. | 358/296 |
| 5,859,711 A | 1/1999 | Barry et al. | 358/296 |
| 5,978,557 A * | 11/1999 | Kato | 358/1.15 |
| 5,995,721 A * | 11/1999 | Rourke et al. | 358/1.15 |
| 6,169,607 B1 | 1/2001 | Harrington | 358/1.9 |
| 6,224,048 B1 * | 1/2001 | Motamed | 270/52.02 |

* cited by examiner

Primary Examiner—Mark Wallerson
Assistant Examiner—Twyler Lamb
(74) Attorney, Agent, or Firm—Hickman Palermo Truong & Becker LLP; Carl L. Brandt; Edward A. Becker

(57) ABSTRACT

A method and apparatus for printing an automatically assembling an electronic document is disclosed. The electronic document comprises first and second sets of pages, in which the first set of pages has a first characteristic and the second set has a second characteristic. Using a parser or based on information embedded in the electronic document, the first and second sets of pages are identified. First and second output devices, that are respectively compatible with the first and second sets of pages, are selected. The sets of pages are routed to the respective output devices, where they are output. Identifying information is also routed to be output with the pages. After the pages are output, a complete document is automatically merged or assembled based on the identifying information. In a preferred embodiment, the electronic document has monochrome or black-and-white pages and color pages. The pages are identified within the document. The monochrome pages are routed to a black-and-white printer and the color pages are routed to a color printer, where they are printed. For the color pages, identifier pages are automatically generated and printed. After printing, the pages are merged into a single document based on the identifier pages. Bar code indicia and a merger apparatus may facilitate the automated merging process.

12 Claims, 27 Drawing Sheets

FIG. 11B 1100 AT BLOCK 622 BEFORE PAGE 1 IS PARSED

| | |
|---|---|
| JOB_ID | 400 |
| PREV_STATE | DEFAULT PRINTING CHARACTERISTICS |
| RESTORE_STATE | DEFAULT PRINTING CHARACTERISTICS |
| LAST_COLOR_STATE | BW |
| CURRENT_PAGE | 0 |
| PREV_PAGE | 0 |
| SEQUENCE | 1 |
| CURRENT_COLOR_STATE | |
| CURRENT_STATE | DEFAULT PRINTING CHARACTERISTICS |
| BW_LINKED_PAGES | NULL |
| COLOR_LINKED_PAGES | NULL |

1102, 1104, 1106, 1108, 1110, 1112, 1114, 1116, 1118, 1120, 1122

AT BLOCK 647 AFTER PAGE 1 IS PARSED

| | | |
|---|---|---|
| 1102 — | JOB_ID | 400 |
| 1104 — | PREV_STATE | PAGE 1 PRINTING CHARACTERISTICS |
| 1106 — | RESTORE_STATE | DEFAULT PRINTING CHARACTERISTICS |
| 1108 — | LAST_COLOR_STATE | BW |
| 1110 — | CURRENT_PAGE | 1 |
| 1112 — | PREV_PAGE | 0 |
| 1114 — | SEQUENCE | 1 |
| 1116 — | CURRENT_COLOR_STATE | BW |
| 1118 — | CURRENT_STATE | PAGE 1 PRINTING CHARACTERISTICS |
| 1120 — | BW_LINKED_PAGES | •——→  PAGE 1  1124 |
| 1122 — | COLOR_LINKED_PAGES | NULL |

1100

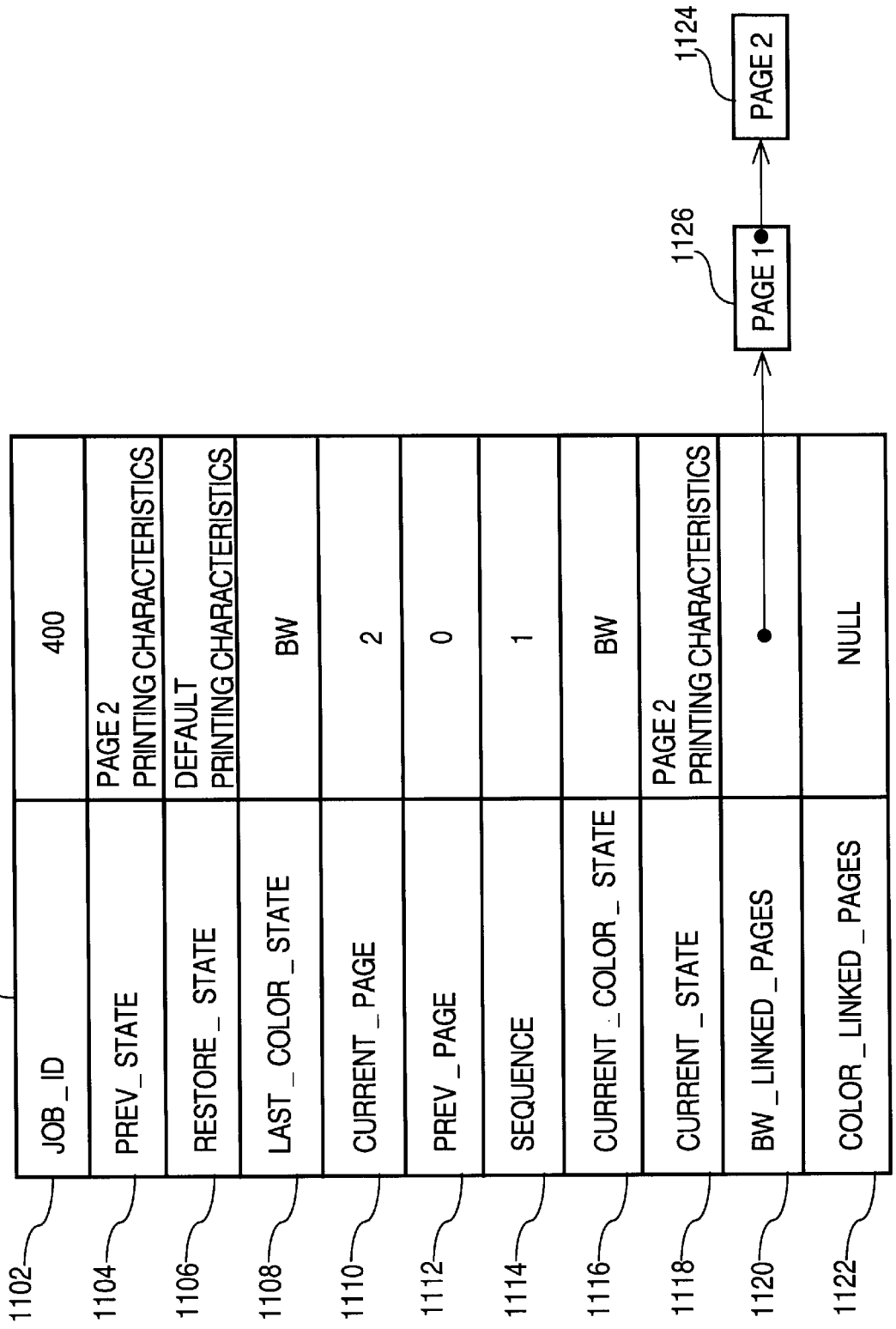

AT BLOCK 680 AFTER PAGE 4 IS PARSED

| | |
|---|---|
| JOB_ID | 400 |
| PREV_STATE | PAGE 4 PRINTING CHARACTERISTICS |
| RESTORE_STATE | PAGE 3 PRINTING CHARACTERISTICS |
| LAST_COLOR_STATE | COLOR |
| CURRENT_PAGE | 4 |
| PREV_PAGE | 4 |
| SEQUENCE | 1 |
| CURRENT_COLOR_STATE | COLOR |
| CURRENT_STATE | PAGE 4 PRINTING CHARACTERISTICS |
| BW_LINKED_PAGES | NULL |
| COLOR_LINKED_PAGES | • → PAGE 4 |

FIG. 11G

1100 — AT BLOCK 680 AFTER PAGE 5 IS PARSED

| | |
|---|---|
| JOB_ID (1102) | 400 |
| PREV_STATE (1104) | PAGE 5 PRINTING CHARACTERISTICS |
| RESTORE_STATE (1106) | PAGE 4 PRINTING CHARACTERISTICS |
| LAST_COLOR_STATE (1108) | BW |
| CURRENT_PAGE (1110) | 5 |
| PREV_PAGE (1112) | 5 |
| SEQUENCE (1114) | 1 |
| CURRENT_COLOR_STATE (1116) | BW |
| CURRENT_STATE (1118) | PAGE 5 PRINTING CHARACTERISTICS |
| BW_LINKED_PAGES (1120) | •——→ PAGE 5 (1132) |
| COLOR_LINKED_PAGES (1122) | NULL |

FIG. 11I

AT BLOCK 680 AFTER PAGE 7 IS PARSED

| | |
|---|---|
| JOB_ID | 400 |
| PREV_STATE | PAGE 7 PRINTING CHARACTERISTICS |
| RESTORE_STATE | PAGE 6 PRINTING CHARACTERISTICS |
| LAST_COLOR_STATE | COLOR |
| CURRENT_PAGE | 7 |
| PREV_PAGE | 7 |
| SEQUENCE | 1 |
| CURRENT_COLOR_STATE | COLOR |
| CURRENT_STATE | PAGE 7 PRINTING CHARACTERISTICS |
| BW_LINKED_PAGES | NULL |
| COLOR_LINKED_PAGES | → PAGE 7 |

OUTPUT PROCESSING AND MERGING OF HYBRID ELECTRONIC DOCUMENTS

FIELD OF THE INVENTION

The present invention generally relates to automatic document processing. The invention relates more specifically to automatically outputting or printing different portions of a hybrid electronic document using different output devices.

BACKGROUND OF THE INVENTION

Computers and output devices such as printers are now extensively used in word processing and other document management tasks. In the past, the most widely used output device for these applications has been a printer that produces output in a single color, normally black ("monochrome printer" or "single-color printer"). Examples of monochrome printers include dot-matrix printers, daisy-wheel printers, and laser printers, such as the LP-M32 Series and the LP-M38 Series that are commercially available from Ricoh Corporation.

Recently, printers capable of printing a paper document in multiple colors ("color printers") have become available. Generally, color printers can print in black, red, blue, and yellow, or a combination of these colors. Thus, using color printers, a computer can print a document that includes both color and non-color pages.

For purposes of discussion in this document, "color pages" of an electronic document are pages that contain printable objects, such as text or graphics, which are rendered in color and cannot be printed in color, accurately or efficiently on a monochrome printer. Conversely, "non-color pages" are pages that contain only objects that may be printed on a black and white printer. Thus, in this context, "color pages" and "non-color pages" may be mutually exclusive.

By including color pages in a document, the effectiveness of the information that is contained within a document is significantly enhanced. For example, multiple colors can effectively communicate complex information, such as numeric data that is presented in a pie chart. Monochrome or black-and-white text, however, is easier to visually perceive and is known to result in less eye fatigue than color text.

Documents that include both color and non-color pages present an output processing problem, though, because the color pages cannot be printed using a black and white printer. When a monochrome printer is the only printer that is available in the user's environment, the document cannot be printed.

To resolve this problem, documents that include both color and non-color pages can be routed to a color printer, which can then be used to print both the color and non-color pages. However, a drawback associated with using a color printer to print non-color pages is that the cost of printing pages on a color printer is generally significantly higher than the cost of printing pages on a black and white printer. For example, it is not uncommon for the cost to print a non-color page on a color printer is often five (5) to ten (10) times greater than the cost of printing the non-color page on a black and white printer. Thus, by printing documents that contain both color and non-color pages on a color printer can significantly increase the cost of generating the document.

In addition, a black and white printer generally prints much faster than color printers of comparable cost. Thus, it is inefficient to print monochrome pages on a color printer.

These problems become more acute for documents that contain a small number of color pages in proportion to the black-and-white pages in the document. For example, it is not efficient or cost-effective to print a 100-page document on a color printer when only one page of the document contains color.

One method for reducing costs associated with printing a document that contains both color and non-color pages is to manually identify the color and non-color pages, and manually redirecting each page to either a color or black and white printer based on whether the particular page is a color or non-color page.

However, a drawback of this approach is that documents often contain a large number of pages. Many of these documents contain color and non-color pages that are mixed throughout the document. Thus, searching a large document to identify the color and non-color pages, and redirecting each page to either a color or black and white printer based on its contents, can be an inefficient and time-consuming task.

In addition, once the pages are printed on separate color or non-color printers, the pages must be manually merged back together to produce a single document. This is a tedious and time-consuming process. In addition, the process is prone to error as certain pages may unintentionally be inserted out of order.

The foregoing problems also exist with respect to output devices other than printers.

Based on the foregoing, there is a need for a method or mechanism that can automatically route pages of a document to a particular output device based on the characteristics or contents of each page.

There is also a need for a method or mechanism that can identify monochrome pages and color pages within an electronic document that has both types of pages.

There is a further need for a way to automatically cause the color pages to be printed at a color printer and the monochrome pages to be printed at a monochrome printer.

There is also a need for a method or mechanism that can be used to automatically merge the pages of a document that are printed using different printing devices. There is a particular need for a method or mechanism that can automatically merge the color pages and monochrome pages, after they are printed, into a single merged document.

SUMMARY OF THE INVENTION

The foregoing needs and objects, and other needs and objects that will become apparent from the following disclosure, are fulfilled by the present invention, which comprises, in one aspect, a method for printing an electronic document that comprises a first set of pages having a first characteristic and a second set of pages having a second characteristic, the method comprising identifying the first set of pages and the second set of pages within the electronic document based on the contents of the document; selecting first and second output devices that are respectively compatible with the first and second characteristics; routing the first and second sets of pages to the first and second output devices, respectively; routing, to the first output device, identifying information that describes the relative position of the first set of pages within the electronic document; and automatically merging the first and second sets of pages into a merged document, based on the identifying information, after the first and second sets of pages are output.

One feature of this aspect is that identifying the first and second sets of pages comprises identifying one or more tokens that identify the first set of pages; scanning the document to locate an instance of the tokens; and identifying a page of the document that contains the instance of the tokens. A related feature is that routing identifying information comprises generating page ordering information and sending the page ordering information to one of the first and second output devices.

According to another feature, routing identifying information comprises generating page ordering information and printing the page ordering information on an identifier page that is routed to one of the first and second output devices. A related feature is that routing identifying information comprises generating page ordering information and printing the page ordering information on the first set of pages.

In another feature, automatically merging the first and second sets of pages further comprises transporting the first and second sets of pages to a merge station.

According to still another feature, automatically merging the first and second sets of pages further comprises merging the first and second sets of pages based on the identifying information. Yet another feature is that routing identifying information further comprises generating page ordering information including a sequence number value, a first page position identifier value, and a following page position identifier value, and routing the values to the first output device.

Still another feature is storing, in association with one or more of the first pages, one or more current page printing characteristics that are associated with one of the first pages in the electronic document. A related feature involves attaching the one or more current page printing characteristics to information that defines a next page among the set of first pages. Still another related feature is storing, in association with a current page among the first pages, one or more current page printing characteristics that are associated with the current page in the electronic document and that identify printing characteristics that are in effect at the end of the current page.

According to another feature, the method involves routing each page in the first set of pages and the second set of pages to both the first output device and the second device; and removing, from the first set of pages that is sent to the second output device, one or more PDL commands that causes printing, whereby the first set of pages is printed only by the first output device. A related feature involves removing, from the second set of pages that is sent to the first output device, one or more PDL commands that causes printing, whereby the second set of pages is printed only by the second output device.

In another feature, automatically merging comprises scanning each page of the first set of pages to identify identifier pages therein that contain the identifying information; discarding the identifier pages; and using the identifying information to select a next page to merge. A related feature is that automatically merging includes temporarily storing the first set of pages in a buffer while the second set of pages is being output; and merging the first and second sets of pages when the second set of pages have been output. Still another related feature is that automatically merging includes testing whether a previous page is identifier page; and sending a current page to a merge station for merging when the previous page is an identifier page.

According to another feature, the method includes generating page-ordering information that identifies a particular ordering of pages from said first set of pages and said second set of pages, and defines how to order the pages after the pages are output by the first and second output devices. A related feature is that generating page-ordering information comprises generating an identifier page that includes the page-ordering information; and routing the additional page to the first output device and to the second output device.

According to another related feature, generating page-ordering information includes generating one or more bar codes that encode the page-ordering information, and outputting an identifier page that contains the bar codes on the first output device before the first set of pages. In still another feature, merging the first set of pages and the second set of pages into a merged document comprises combining the first and second sets of pages based upon the page-ordering information.

In other aspects, the invention encompasses a computer apparatus, a computer-readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which:

FIG. 11B further illustrates possible values for the set of state parameters shown in FIG. 11A;

FIG. 11D further illustrates possible values for the set of state parameters shown in FIG. 11A;

FIG. 11G further illustrates possible values for the set of state parameters shown in FIG. 11A;

FIG. 11I further illustrates possible values for the set of state parameters shown in FIG. 11A;

DETAILED DESCRIPTION OF THE PREFERRED EMBODIMENT

Figure 1:
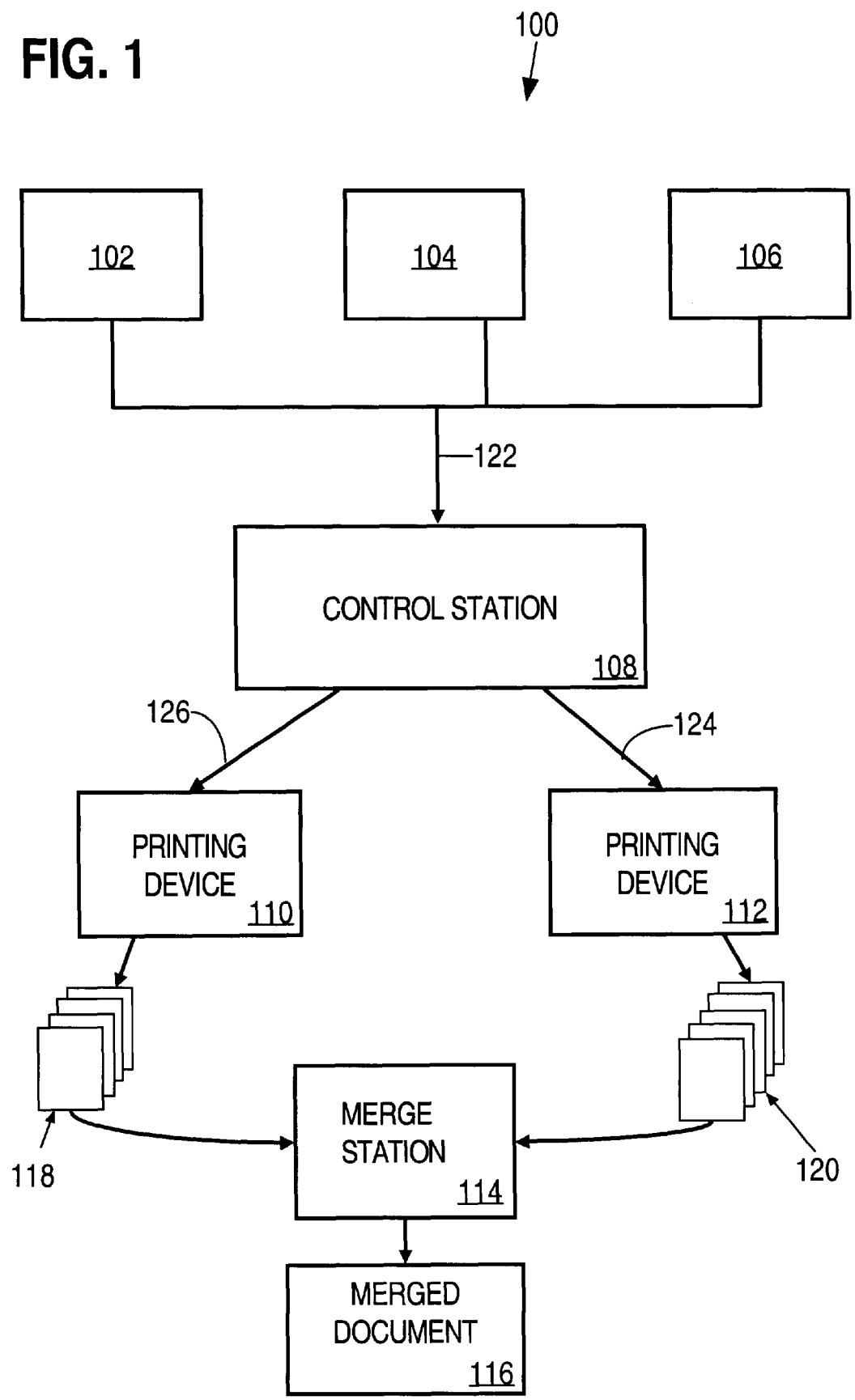
FIG. 1 is a block diagram of a document processing system in which the invention may be utilized.

A method and apparatus for processing a document using multiple output devices is described. In the following description, for the purposes of explanation, numerous specific details are set forth in order to provide a thorough understanding of the present invention. It will be apparent, however, to one skilled in the art that the invention may be practiced without these specific details. In other instances, well-known structures and devices are shown in block diagram form in order to avoid unnecessarily obscuring the invention.

For example, the reader is referred to U.S. Pat. No. 5,319,748, "Method and Apparatus to manage Picture and Pageset for Document Processing"; U.S. Pat. No. 5,325,484, "Method and System to handle Inclusion Of External Files into a Document Processing Language"; U.S. Pat. No. 5,353,388, "System and Method for Document Processing"; U.S. Pat. No. 5,499,329, "Method and System to Handle Context of Interpretation in a Document Processing Language"; U.S. Pat. No. 5,504,891, "Method and Apparatus for Format Conversion of a Hierarchically Structured Page Description Language Document"; and U.S. Pat. No. 5,506,985, "Method and Apparatus for Format Conversion of a Hierarchically Structured Page Description Language Document", the entire contents of which are hereby incorporated by reference as if fully set forth herein. The information in such documents may be useful to the reader for background and context regarding the problems and solutions involved in the present invention, and for understanding how to make, use, or otherwise implement aspects or elements of the present invention.

Operational Context

In one embodiment, a document processing mechanism, having a Control Station, receives information that defines a particular document ("document information"). Document information may be received in a variety data formats, with each format having a set of tokens or commands that define how the objects and text are to be printed for each page of the document. For example, the document information may be in the form of a file produced by a particular application program, such as a Microsoft Word® file. Alternatively, the document information may be a file formatted in a page description language ("PDL"), such as a PostScript file or a file formatted in the Printer Control Language ("PCL") defined by Hewlett-Packard Company. In this context, the term PDL is not limited to any particular printer command. For example, the term PDL includes the printer commands that are used by printing devices that are manufactured by such companies as Epson, Canon, Hewlett-Packard, etc.

Each format contains one or more particular tokens or commands that indicate how the text and objects are to be printed. For example, the command "setcolorspace" in a PostScript file defines an object that is to be printed in color.

Upon receiving the document information, the Control Station examines each page of the document. Based on a characteristic of each page, the Control Station selects a particular output device to output the page of the document. For example, the Control Station selects a particular printer depending on whether the current page of the document is monochrome or color. The color of a page or objects within the page is merely one example of a characteristic that can be used as a basis for routing a page to an output device. The Control Station then routes the page to the particular output device for further processing, such as printing.

In certain embodiments, in addition to routing pages to different printing devices, the Control Station generates page-ordering information based on the contents of each page. The page-ordering information is used by a merging mechanism to merge the pages of a document, once they are printed on the different printing devices, back into a single document ("merged document").

Because the document processing mechanism selects a particular printing device based on the contents of a complete page, it is not limited to selecting a printing device based on any particular token or command within a document. For explanation purposes only, however, certain embodiments shall be described in terms of selecting a printing device based on whether a particular page within a document is either a color or non-color page.

Document Processing System

FIG. 1 is a block diagram of a document processing system 100 in which the invention can be used. Generally, the system 100 includes a control station 108, a merge station 114, one or more computing devices 102, 104 and 106, and a plurality of printing devices 110 and 112.

The control station 108 is a computer system, or group of hardware or software components or process operating in a computer system. For example, control station 108 may be a stand-alone or network of personal computers, workstations, mainframes or other like computing devices.

The computing devices 102–106 each comprise a workstation, personal computer, or other device that can generate a document. Document information for documents that are generated using computing devices 102–106 is sent to the control station 108 for printing. Document information may be sent to the control station 108 using a variety of methods. For example, document information may be sent to the control station via a network or modem connection 122. Alternatively, document information may be stored on a mass storage device, such as a floppy disk, and then loaded into the control station 108 separately from the disk.

The printing devices 110–112 are examples of resources or output devices that can be used to print the pages of a document. A variety of output devices or printing devices can be used in printing the pages of a document. Thus, the invention is not limited to any particular type of printing device. For example, printing devices 110–112 may be a combination of color printers, black and white printers, plotters, copiers, and other devices that can be used for printing pages of a document.

Upon receiving a request to print a particular document, the control station 108 examines the document information page by page. Based on the contents of each page, the control station 108 selects a particular printing device from the printing devices 110–112 for printing a particular page. The control station 108 then routes the page to the selected printing device for printing.

For example, assume that printing device 110 is a color printer and that printing device 112 is a black and white printer. Assume further that the control station 108 determines that for a particular document, page "10" is a color page and page "11" is a non-color page. In response, the control station 108 routes color page "10" to the color printing device 110 and non-color page "11" to the non-color printing device 112.

In addition to routing each page to a particular printing device, in certain embodiments, the control station 108 generates page ordering information that can be used to determine the correct ordering of pages once they have been printed by the plurality of printing devices 110–112. The set of printed pages 118, 120 are pages, associated with a particular document, which have been respectively printed by printing devices 110–112. In one embodiment, the control station 108 causes additional pages to be printed by printing devices 110–112. The additional pages include page-ordering information that can be used to correctly merge the set of printed pages 118–120 into a single document.

In another embodiment, the control station 108 causes page-ordering information to be added directly to the document pages. The merge station 114 then reads the page ordering information from the printed pages of the document to correctly merge the set of printed pages 118–120 into a single document. The use of page ordering information is described in detail below.

To merge the set of printed pages 118–120 into a single document, the set of printed pages 118, 120 are transported to the merge station 114. The set of printed pages 118–120 may be transported to the merge station 114 using a variety of methods. For example, in one embodiment, one or more high-speed feeders are used to transport the set of printed pages 118–120 from the plurality of printing devices 110 and 112 to merge station 114. In other embodiments, the set of printed pages 118–120 are manually carried and placed in a "input tray" that is associated with merge station 114.

Once the merge station 114 receives the set of printed pages, the page ordering information previously added by the control station 108 is used to merge the pages into a single document of appropriate order. The particular structure of merge station 114 is not critical. What is important is that merge station includes two or more automatic paper handling or paper feeding mechanisms that can lift and transport sheets from one or more input trays, identify the page number of the document to which the sheets belong, and merge the documents into correct order.

Generating Pages from PDL Files

Figure 2:
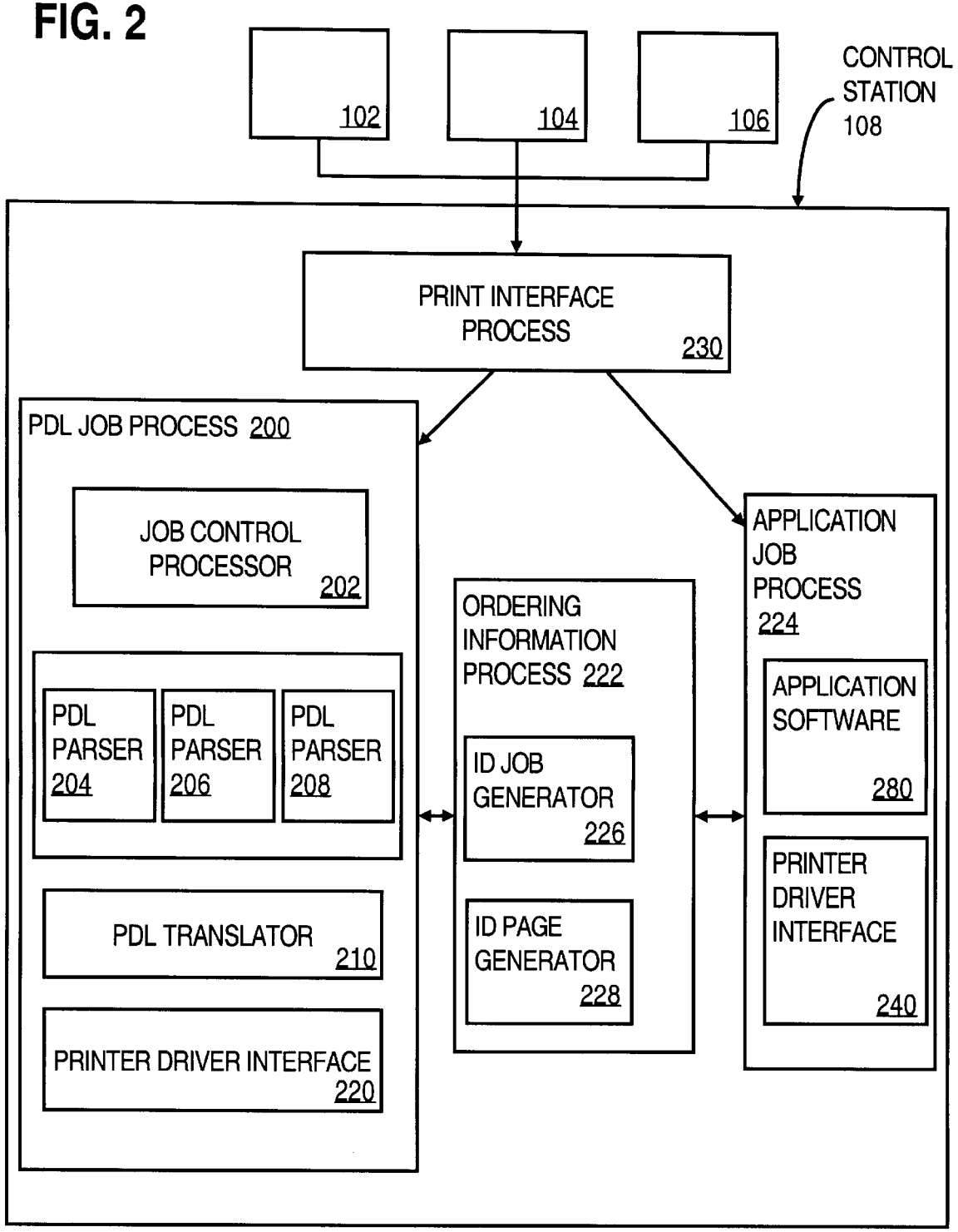
FIG. 2 is a block diagram of the system of FIG. 1 showing certain internal details.

FIG. 2 is a block diagram of control station 108 showing certain internal details thereof. As depicted in FIG. 2, control station 108 contains a print interface process 230, a PDL job process 200, an ordering information process 222 and an application job process 224.

The print interface process 230 receives print requests from the computing devices 102–106. Each print request asks the control station to print a particular document. Each print request contains a set of print parameters that indicate specific details as to how a particular document is to be printed. For example, the print parameters indicate the particular tokens or commands to be used for selecting a particular printing device for each page, how many copies of the document are to be printed, or whether a particular set of printing devices are to be used for printing the pages of the document. Other information can be included in a print request. What is important is that the print request contains sufficient information to instruct the print interface process 230 how to print the document.

Upon receiving a print request, the print interface process 230 determines the particular format of the document that is associated with a print request. For example, the particular document may be in the form of an application document file, such as a Microsoft Word® file, or a printer command file such as a PostScript or PCL. If the print interface process 230 determines that the document is a PDL file, then control is passed to PDL job process 200. Alternatively, if the print interface process 230 determines that a particular document is an application document file, then control is passed to the application job process 224.

The PDL job process 200 includes a job control process 202, one or more page description language (PDL) parsers 204, 206 and 208, a page description language (PDL) translator 210 and a printer driver interface 220.

The job control process 202 interprets the print parameters associated with a particular print request and initializes a set of internal parameters for properly generating the requested documents. For example, if a print request contains a set of parameters that indicate multiple copies of a document are to be printed, the job control process 202 initializes an internal document count parameter to ensure that the correct number of pages are routed to the selected printing devices.

The job control process 202 then passes the PDL file to a PDL parser 204, 206, 208 that corresponds to the particular PDL format of the document. For example, if the PDL file is a PostScript file, the job control process 202 passes the PDL file to a corresponding PostScript parser. However if the if the PDL file is a PCL file, the job control process 202 passes the PDL file to a corresponding PCL parser. The term "parser", when used in reference to PDL parser 204, 206, 208, is used in a broad sense to refer to a software component that can interpret a formatted document and determine page boundaries and other aspects needed for printing. A true parser need not be used. An interpreter, scanner, or similar software element is suitable.

The PDL parsers then parse the document, page by page, to identify tokens that indicate that a particular type of printing device is to be used for printing the page. For example, if a particular page contains a token that indicates that text is to be printed in the color, the PDL parser identifies the page as a color page and that a printing device that is capable of printing a color page must be selected.

Upon encountering a color object, the PDL parser also determines where the page starts and ends in relation to the color object. For example, the PDL determines whether the color object is entirely within one page, or crosses a page boundary so as to extend across two or more pages.

When a color page is identified, the PDL parser interfaces with the ID job generator 226 and ID page generator 228 to generate page-ordering information that can be used to merge the pages of a document once they have been printed on the selected printing devices. In one embodiment, the page-ordering information is generated as one or more bar codes that can be scanned and read by a conventional bar code reader.

In one embodiment, the page ordering information is added to each page of the document. The page ordering information can be added to either the front or the back of each page of the document. In certain embodiments, the page-ordering information is added to each page using a method that causes it to be undetected in the merged document.

In an another embodiment, the PDL parser generates new, additional pages that include the page ordering information. These additional pages are printed as part of the document and later used to create the merged document.

Figure 3:
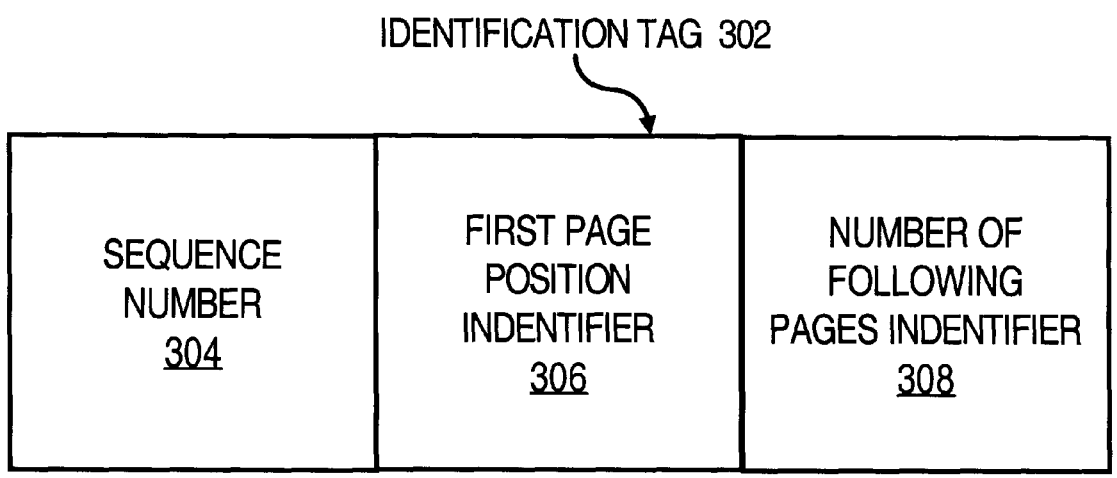
FIG. 3 illustrates an exemplary identification tag that includes page-ordering information.

FIG. 3 illustrates an exemplary identification tag 302 that includes page-ordering information that can be used to merge the pages of a document that are printed on multiple printing devices. The identification tag 302 includes a sequence number 304, a first page position identifier 306 and a following pages identifier 308.

The sequence number 304 is a unique number, or other unique indicia, that can be used to identify a particular document that is being printed. The ID job generator 206 generates a new sequence number 304 for each document print request. The ID job generator 206 also generates a new sequence number 304 for each copy of a particular document that is requested. For example, to print three copies of a single document, the ID job generator 206 generates three distinct sequence numbers. In one embodiment, the ID job generator 206 resets the sequence number 304 to zero at the beginning of each day.

The first page position identifier 306 identifies the first page in which color pages are to be inserted in the document. The ID page generator 208 generates a first page position identifier 306 for each group of color pages that are to be printed. The number of following pages identifier 308 indicates the number of color pages that are to follow each first page position identifier 306.

Figure 4:
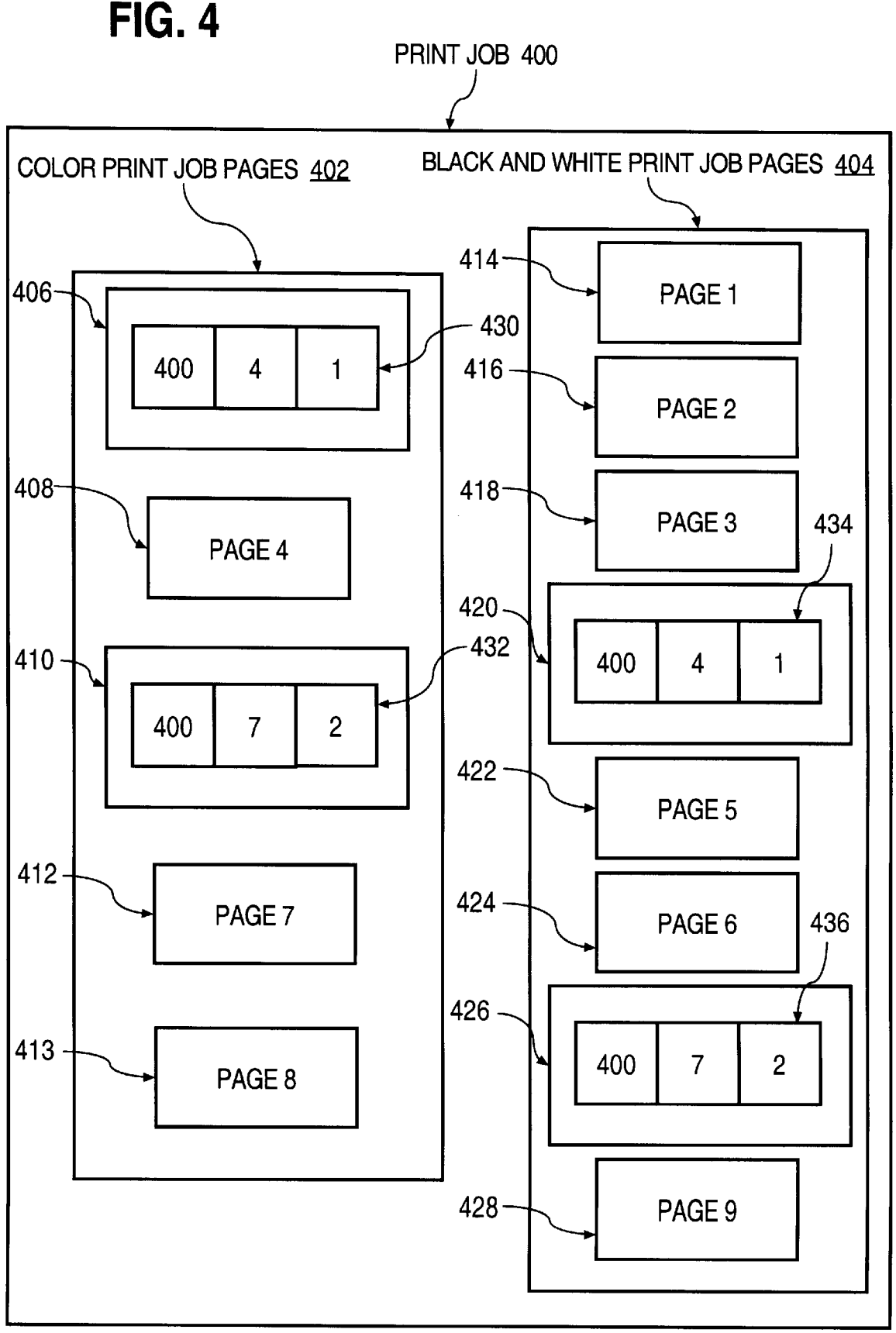
FIG. 4 illustrates an exemplary set of pages that were generated for a print job.

FIG. 4 illustrates a set of exemplary pages that are generated for a hypothetical print job 400. Print job 400 includes color print job pages 402 and black and white print job pages 404. The color print job pages 402 include color pages 408, 412 and 413, and additional pages 406 and 410. The black and white print job pages 404 include non-color pages 414, 416, 418, 422, 424 and 428, and additional pages 420 and 426.

In this example, whenever the PDL parser 204 identifies a color page, additional pages are generated and inserted into color print job pages 402 and black and white print job pages 404. Each additional page 406, 410, 420 and 426 respectively includes an identification tag 430, 432, 434 and 436. The identification tags 430, 432, 434 and 436 identify where color pages 408, 412 and 413 are to be merged into the black and white print job pages 404 to create a single merged document.

For example, the identification tags 430 and 434 in additional pages 406 and 420 indicate that the page belongs to print job 400 and that only "1" page (color page 408) is to be inserted as page "4" in black and white print job pages 404. Conversely, the identification tags 432 and 436 in additional pages 410 and 426 indicate that the pages belong to print job 400, but that "2" pages (color pages 412 and 413) are to be inserted as pages "7" and "8" in black and white print job pages 404.

In certain embodiments, an additional page is generated for each color page that is to be inserted into the black and white print job pages 404. Thus, the value of the following pages identifier 308 within an identification tag is by default always equal to "1".

Generating Header File Information

As stated above, PDL parser 204 parses each page of the document on a page by page basis. Based on its contents, each page is routed to a selected printing device. A potential problem with routing different pages of a document to different printing devices is that the current printing characteristics need to be maintained between pages.

Figure 5:
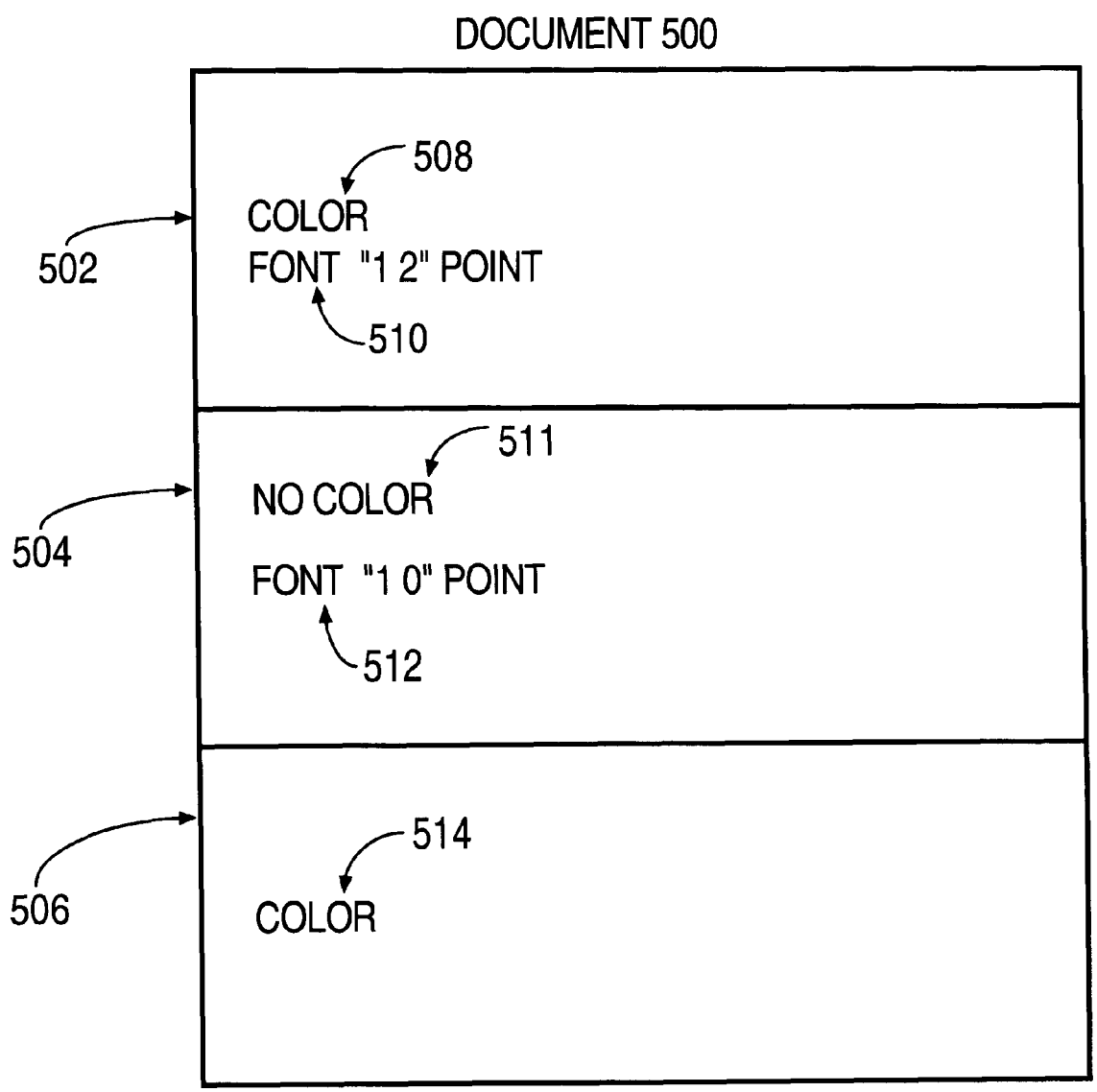
FIG. 5 illustrates exemplary pages of a document that contain multiple tokens.

For example, FIG. 5 illustrates a document 500 that includes pages 502, 504 and 506. Page 502 contains a "color" token 508 identifying page 502 as a color page and a "font" token 510 indicating that text is to be printed using a font of "12" point. Alternatively, page 504 contains a "font" token 512 indicating that text is to be printed using a font of "10" after the command. Because the no color command is the first command of the page 504, the page is a non-color page. This no color command lasts until the next color command is encountered at the middle of page 506.

Conversely, page 506 contains a "color" token 514 but does not contain a "font" token, thus indicating the "10" point font of page 504 is to be continued in page 506. However, if pages 502 and 506 are routed to a color printer and page 504 is routed to a black and white printer, the printing characteristics for page 502, that are not subsequently modified by the contents of page 504, will also be applied to page 506. Therefore, page 506 will incorrectly be printed using the "12" point font of page 502 instead of the "10" point font of page 504.

To address this problem, in certain embodiments, the PDL parser 204 stores the "current printing characteristics" of each page before routing it to a selected printing device. In this context, the current printing characteristics are the printing characteristics that are current at the end of a page. The current printing characteristics are then attached as header information to the next page. The attached header information is used by next page as its current printing characteristics, which may then be modified by the contents of the page.

In an alternate embodiment, PDL parser 204 routes a copy of each page to every printing device that is used to print pages of the document. However, before routing each page, the PDL parser 204 removes the print command that actually causes the page to be printed, from each copy that is routed to a non-selected printing device. For example, if the PDL parser parses a page of a PostScript document that contains a color token, and both a color and black and white printer are being used to print the document, a copy of the page is routed to both the color and black and white printer. However, the "showpage" command, which causes a PostScript page to be printed, is removed before the non-color copy is routed to the black and white printer so that only the copy routed to the color printer is printed.

Translating Pages to a Different Format

In certain cases, the pages of a document may be in a particular format that is not supported by a selected printing device. When this occurs, the PDL translator 210 is used to translate the particular page into a format that can be printed by the selected printing device. Once translated, the particular page is then routed to the selected printing device. For example, if a particular page is in PostScript format and the selected printing device can only print pages that are in PCL format, the PDL translator 210 translates the particular page into PCL format and then routes it to the selected printing device. The method of translating a document from one format to another is well known art. For example, Adobe Acrobat, which is commercially available from Adobe Systems, Inc. of San Jose, Calif., can be used to convert PostScript files into Portable Document Format (PDF) files, which can be printed by various printers such as PCL printers.

By separately formatting each page, printing devices that require different file formats can be used to print the pages of a single document. For example, if a color printer requires pages to be in PCL format, while a black and white printer requires pages to be in PostScript format, separately formatting each page allows the document to be printed on the two printing devices.

In another embodiment, when a print request is received for a document that is in a format that is not supported by the selected printing device, the document is first translated to the appropriate format before it is passed to the PDL parser. In certain cases this may significantly reduce document-processing time, as translation is no longer performed on a page by page basis.

Printer Driver Interface

The information produced by PDL parser 204 and PDL translator 210 may not be directly printable by a printing device 110–112. Therefore, printer driver interface 220 receives information from PDL parser 204 and PDL translator 210 and produces a bitmap or other information in a format that can be rendered by printing device 110–112. In addition, printer drivers may be used to control attachment such as sorter.

The specific functions carried out by printer driver interface 220 depend upon the type of output device that is used as printer device 110–112. For example, some printers contain built-in PostScript language interpreters ("PostScript engines"). If the source document is also formatted in PostScript, then printer driver interface 220 may merely pass the PostScript file to the printing device 110–112, which internally interprets it and renders an image on a page. For example, suppose the black and white printer is a LaserJet printer from Hewlett Packard and the input is a Postscript file. The process is to parse the incoming command sequence and to use the printer driver to generate the PCL commands by passing the appropriate parameters.

Generating Pages from Application Files

When an application file is received, the operator opens the file and selects the print command. Based upon the customer's requests and volumes, the operator can choose to use multiple printing devices. The application software sends the device independent commands and parameters values to the device drivers of the multiple printing devices. The process is similar to those described in FIGS. 6A through 6F. The major difference being that instead of receiving a printer command language, the device drivers receive standard interface commands and parameter values. The process of generating the printer command files, however, is the same as those illustrated in FIGS. 6A through 6F.

Processing Print Requests

FIG. 6A through FIG. 6G are flow diagrams that illustrates a method for processing the pages of a document using different output devices. The steps of FIG. 6A through FIG. 6G will be explained with reference to the print job illustrated in FIG. 4 and a set of state parameters that are illustrated in FIG. 11A through FIG. 11K. For explanation purposes, the example is discussed in the context of printing a document that includes both black-and-white ("BW") and color pages. However, the invention and this method is not limited to any particular printing or output device, nor is it limited to using any particular set of tokens or commands for selecting the particular printing or output devices. Any output operation directed to any output device is contemplated.

Figure 11A:
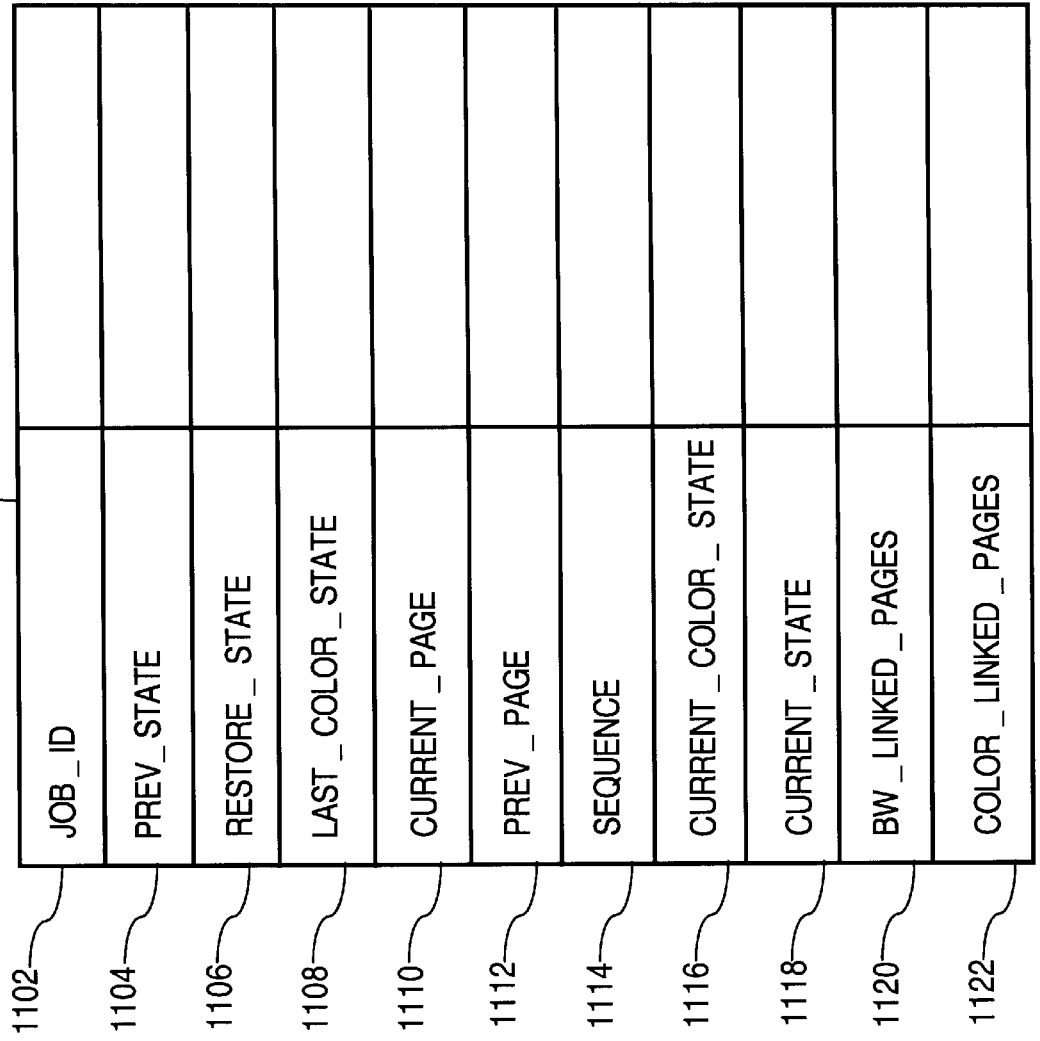
FIG. 11A illustrates a set of state parameters that can be used to process a print request.

FIG. 11A illustrates a table 1100 that stores or represents the values of a set of state parameters that are used to process a print request in accordance with an embodiment of the invention. The state parameters include a group of variables, records, pointers and linked lists that are used to maintain different states that exist during the processing of an input request.

In this example, table 1100 includes values called JOB_ID 1102, PREV_STATE 1104, RESTORE_STATE 1106, LAST_COLOR_STATE 1108, CURRENT_PAGE 1110, PREV_PAGE 1112, SEQUENCE 1114, CURRENT_COLOR_STATE 1116, CURRENT_STATE 1118, BW_LINKED_PAGES 1120 and COLOR_LINKED_PAGES 1122.

The JOB_ID 1102 is used to identify the current print job. The CURRENT_STATE 1118, PREV_STATE 1104, and RESTORE_STATE 1106 represent records or structures that are used to store the printing characteristics of the current page, the previous page and the restore page respectively. By storing the printing characteristics of certain pages, the correct printing characteristics are maintained during the printing of each page. The LAST_COLOR_STATE 1108 is used to indicate whether the last group of pages were black-and-white or color. Conversely, the CURRENT_COLOR_STATE 1116 is used to indicate whether the current page is black-and-white or color. The CURRENT_PAGE 1110 is used to indicate the total number of pages that have input and parsed for the current document. The PREV_PAGE 1112 is used to indicate the page number of the next page that needs to be sent to a printing device. The SEQUENCE 1114 is used to count the number of color pages that are consecutively encountered while parsing the pages of the document. The BW_LINKED_PAGES 1120 and the COLOR_LINKED_PAGES 1122 are pointers that are respectively used to maintain linked lists of pointers to BW and color pages that have not yet been sent to a corresponding printing device.

Figure 6A:
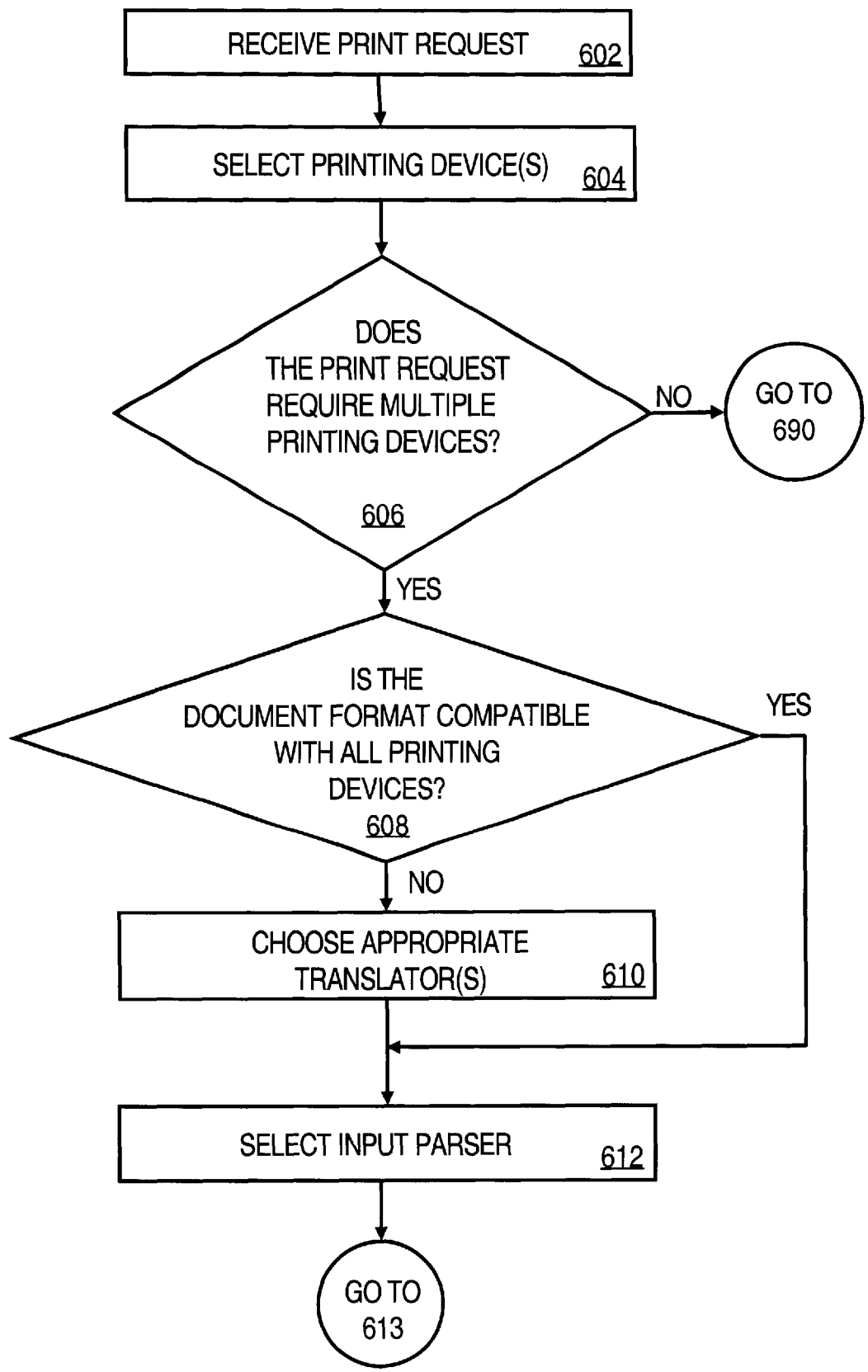
FIG. 6A is a flow diagram that illustrates a method for printing pages of a document on different printing devices.
Figure 6B:
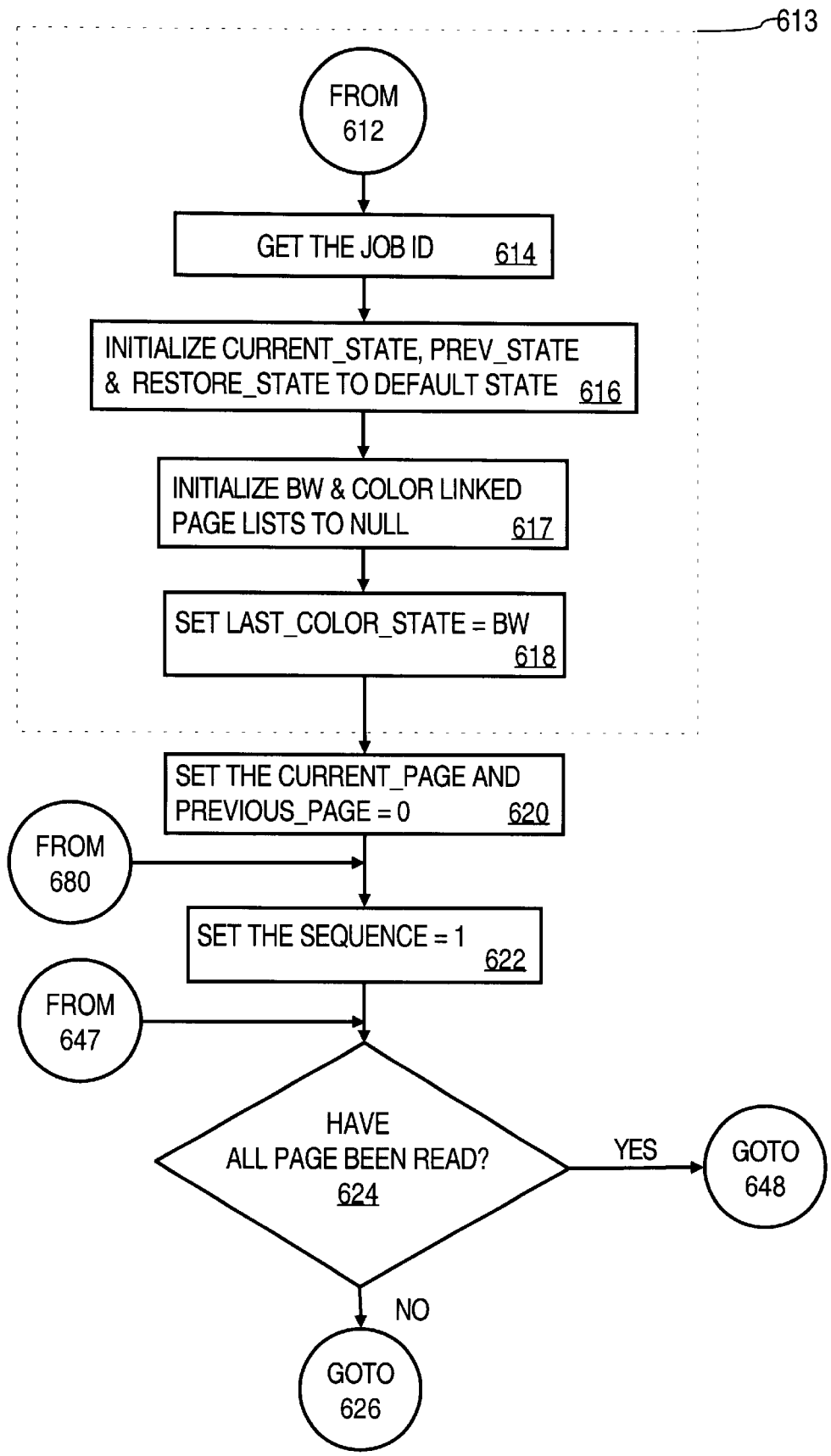
FIG. 6B is a flow diagram that illustrates further steps in the method of FIG. 6A.
Figure 6C:
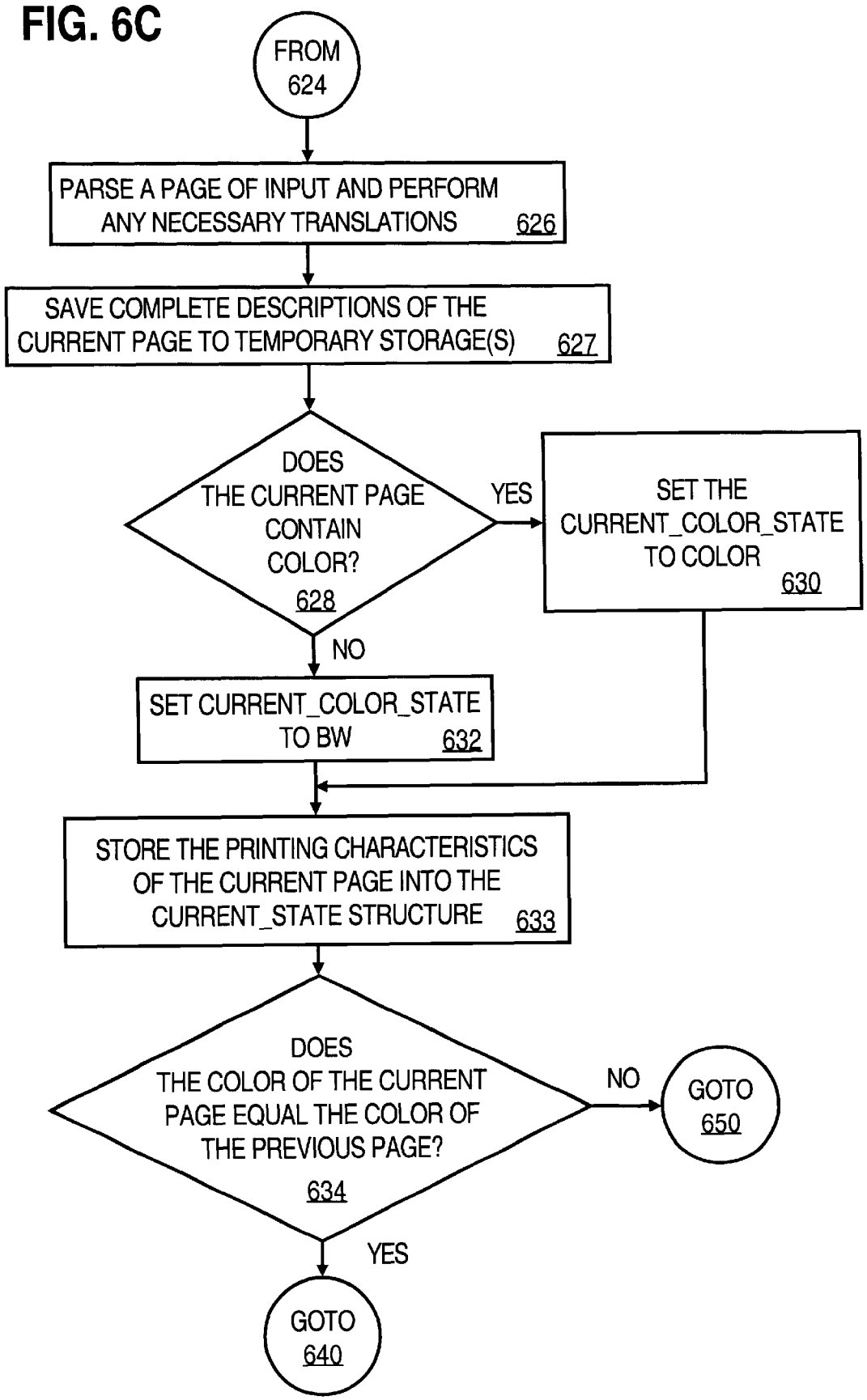
FIG. 6C is a flow diagram that illustrates further steps in the method of FIG. 6A.
Figure 6D:
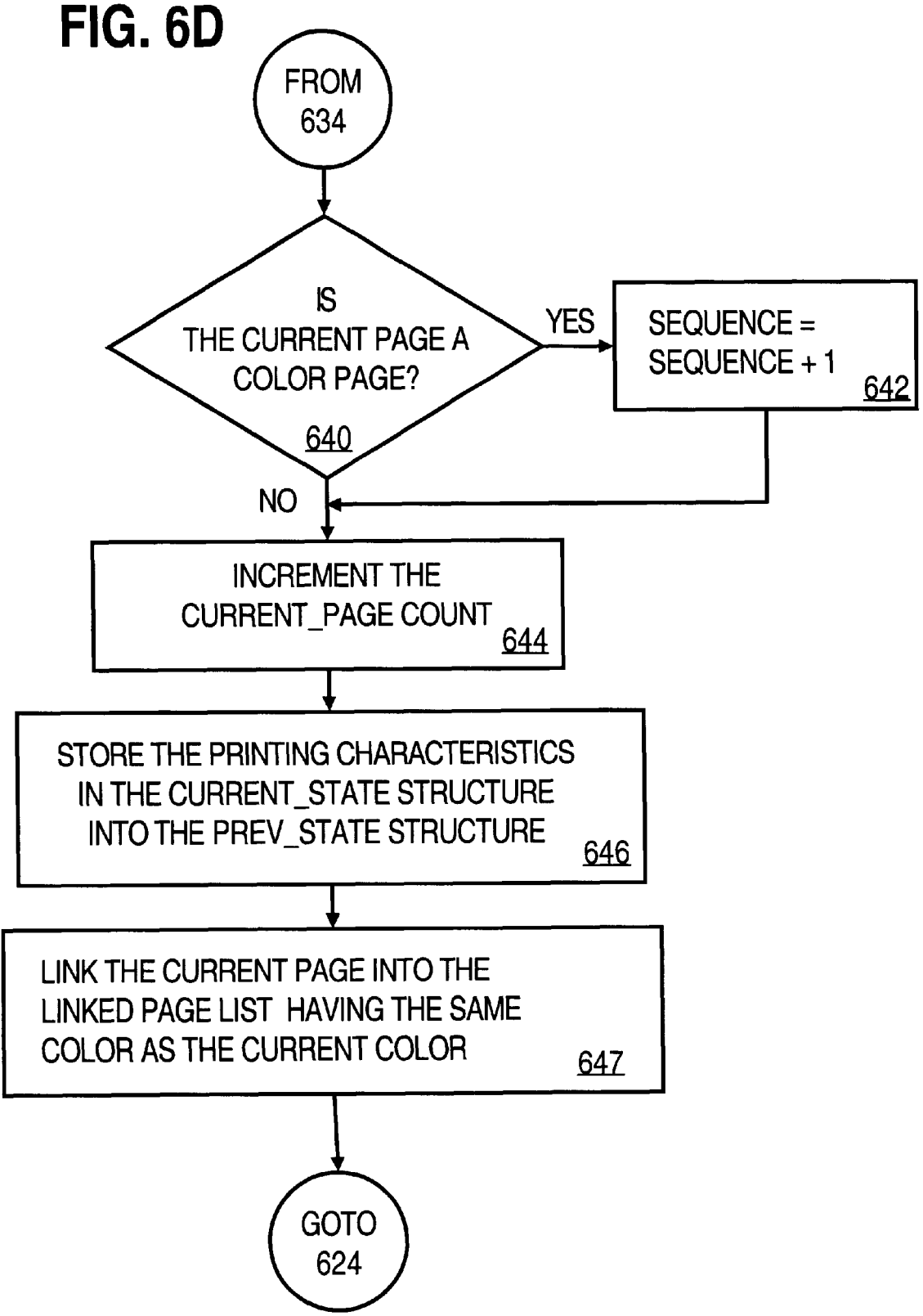
FIG. 6D is a flow diagram that illustrates further steps in the method of FIG. 6A.
Figure 6E:
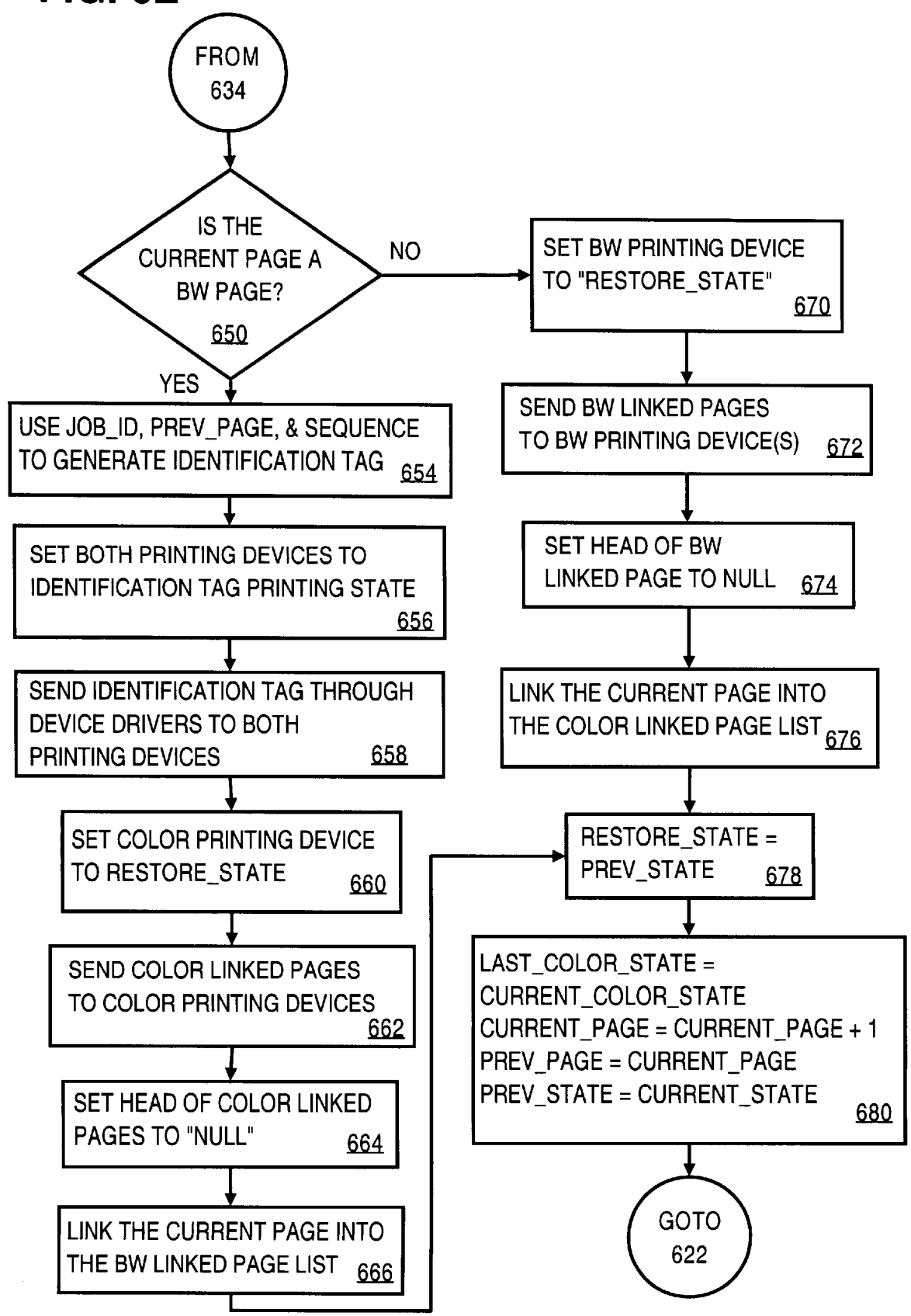
FIG. 6E is a flow diagram that illustrates further steps in the method of FIG. 6A.
Figure 6F:
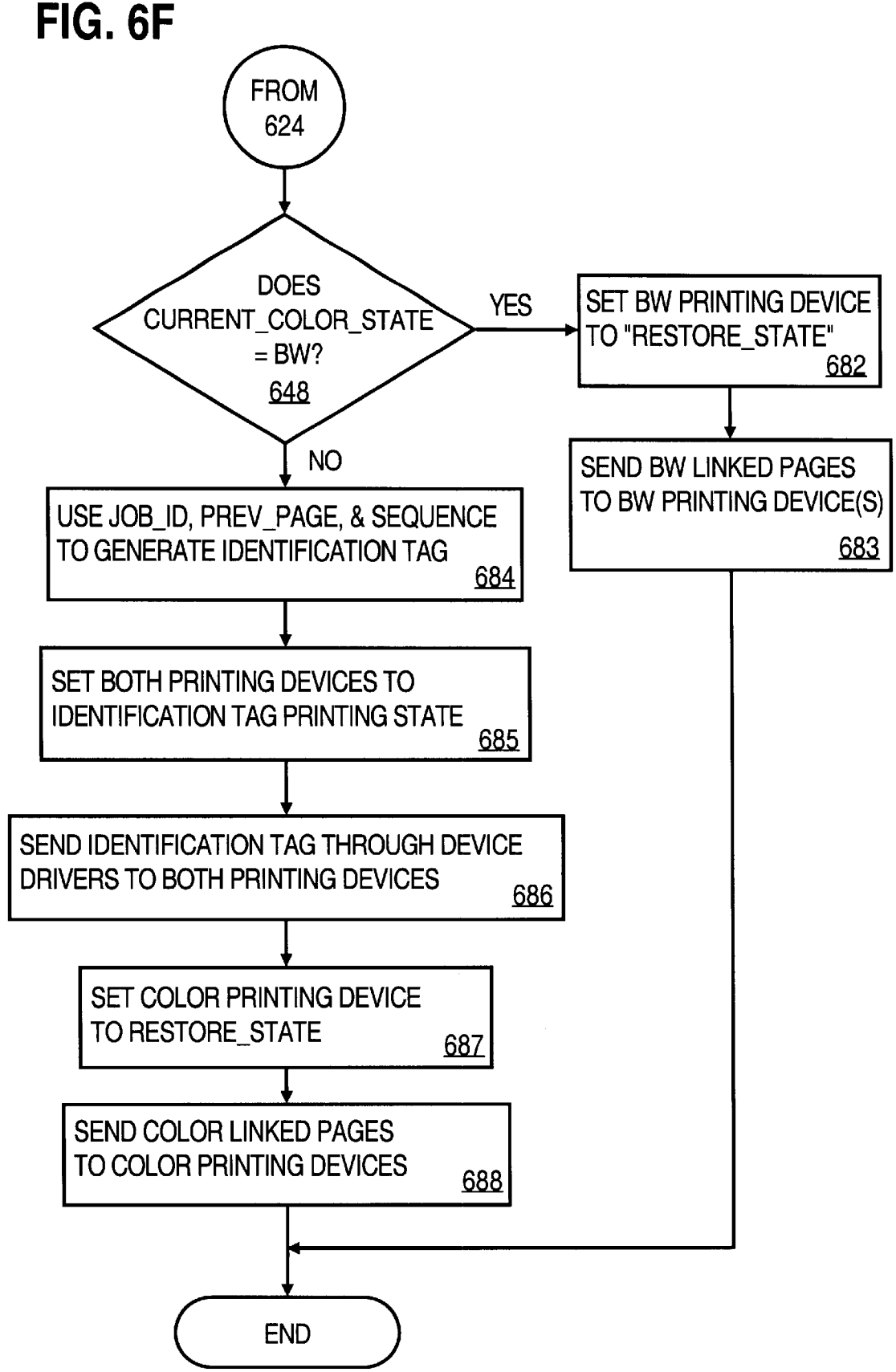
FIG. 6F is a flow diagram that illustrates further steps in the method of FIG. 6A.

Referring to FIG. 6A, at block 602, a print request is received. The print request includes print parameters that indicate specific details as to how the particular document is to be printed and the particular tokens or commands, if any, that are used to distinguish pages of the document. For example, a print request may indicate that color pages are to be printed on a color printing device and that non-color pages are to be printed on a black and white printing device.

As shown by block 604, one or more printing devices are selected based on the particular print parameters that are received. Block 604 may involve the steps of determining which printers are connected to the system or available in a network associated with the system, examining each printer to determine its capabilities, and matching the print request to the available print parameters. In addition, in certain embodiments, the particular printing devices may be selected by an operator or user of the system.

As shown by block 606, it is determined whether the print request requires the use of multiple printing devices. In one embodiment, information contained in the print request indicates whether multiple printing devices are used. For example, printing device information may be contained in a header or as part of the print request envelope that indicates the number of printing devices that are to be used. In another embodiment, user or operator input is used to determine whether multiple printing devices are used. In still another embodiment, a token or command that is included in the document itself is used to indicate whether multiple printing devices are to be used.

If the print request does require multiple printing devices, then control proceeds to block 608.

Figure 6G:
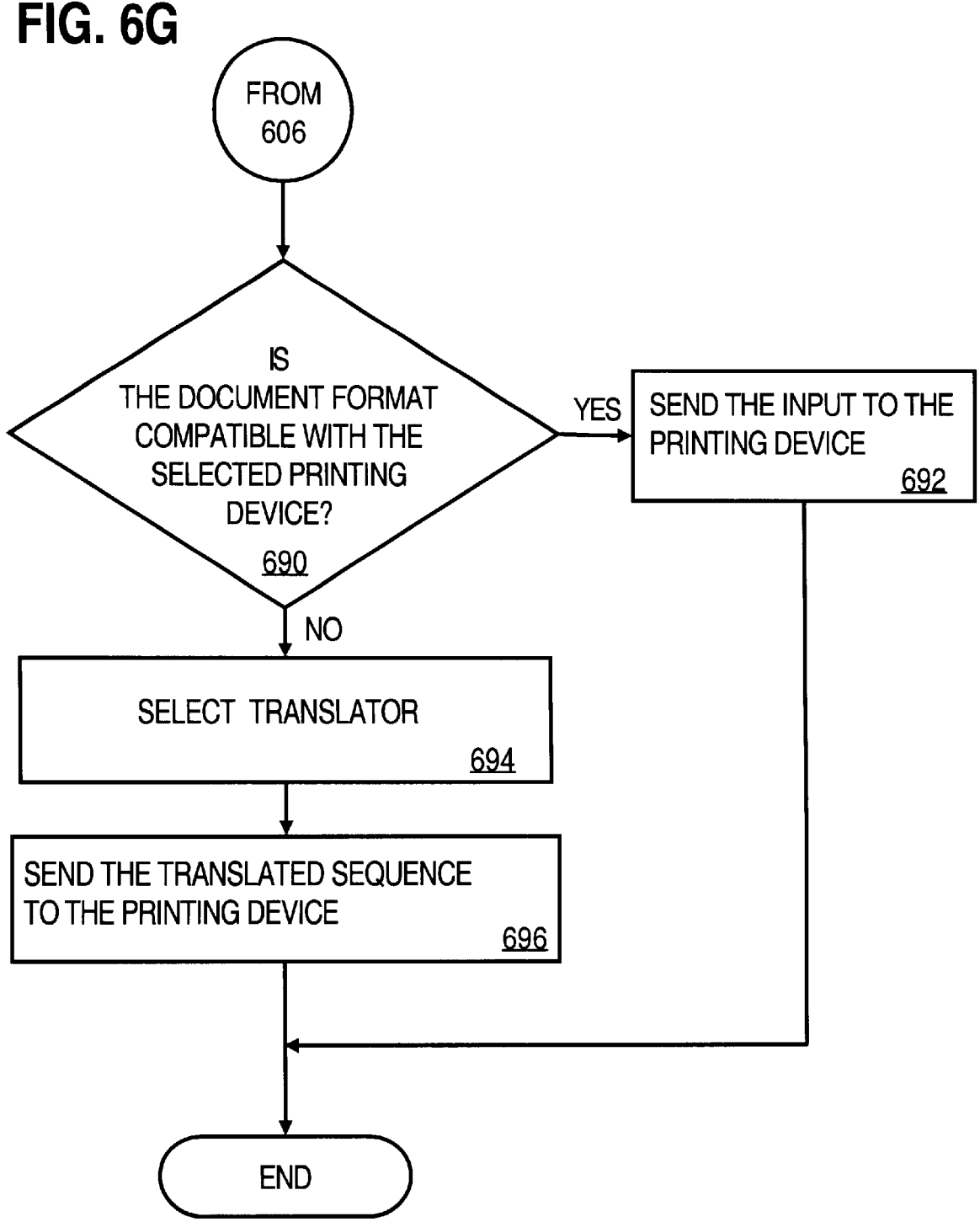
FIG. 6G is a flow diagram that illustrates further steps in the method of FIG. 6A.

Alternatively, if the print request does not require multiple printing devices, at block 690 in FIG. 6G, it is determined whether the document format is compatible with the selected printing device. For example, a particular document may be in postscript format while the printing device can only print documents in PCL format. If the document format is compatible with the selected printing device, then at block 692 the document is routed to the selected printing device for printing.

Alternatively, if the document format is not compatible with the selected printing device, then at block 694, a translator is selected for translating the document into a format that is compatible with the printing device. At block 696, the document is translated into a compatible format and then routed to the selected printing device for printing.

At block 608 in FIG. 6A, it is determined whether the document format is compatible with all of the selected printing devices. For example, one of the selected printing devices may be only able to print documents that are in postscript format while a second printing device may only be able to print documents that are in PCL format. Thus, if the print request is associated with a document that is in postscript format, a translator will be needed to convert the pages that are to be printed on the second printing device into the PCL format. If at block 608 it is determined that the document format is compatible with all of the selected printing devices, then control proceeds to block 612.

However, if at block 608 it is determined that the document format is not compatible with all of the selected printing devices, then at block 610, one or more translators are selected for translating certain pages of the document.

At block 612, a parser, which is compatible with the particular format of the document is selected. For example, if the document is formatted as a postscript file, then a parser that is capable of parsing a postscript file is selected.

At block 613, certain state parameters are initialized to allow for the processing of pages that are associated with the print request. As part of the initialization, at block 614, a job ID that is associated with the print request is obtained. For example, as illustrated in FIG. 11B, the job ID ("400") shown in FIG. 4 is stored in JOB_D1102.

At block 616, a set of records that used to store the current, previous and restore printing characteristic states of the document are initialized to a default value. These records are used to maintain the correct printing characteristics for each page that is sent to a printing device. For example, as illustrated in FIG. 11B, the CURRENT_STATE 1118, the PREV_STATE 1104 and the RESTORE_STATE 1106 are set to a default printing characteristic state.

At block 617, the BW and color linked page lists are initialized to "NULL". The linked page lists are used to maintain pages of the document that have not yet been sent to a corresponding printing device. For example, as illustrated in FIG. 11B, the BW_LINKED_PAGES 1120 and COLOR_LINKED_PAGES 1122 are initialized to NULL.

At block 618 a last color state variable is initialized to BW. For example, as illustrated in FIG. 11B, LAST_COLOR_STATE 1108 is initialized to "BW".

At block 620, a current page counter and a previous page counter variables are initialized to zero ("0") to indicate that no pages have been parsed yet. For example, as illustrated in FIG. 11B, CURRENT_PAGE 1110 and PREV_PAGE 1112 are initialized to zero ("0").

At block 622 a sequence variable is set to one ("1") to reset the counter which indicates the number of color pages that have been consecutively encountered while parsing the pages of the document. For example, as illustrated in FIG. 11B, SEQUENCE 1114 is set to one ("1").

FIG. 11B illustrates an example of possible values for state parameters in table 1100 after performing block 622, but before page 414 of print job "400" in FIG. 4 is parsed.

At block 624 it is determined whether all of the pages of the document have parsed. If all of the pages of the document have been parsed, then control proceeds to block 648. However, if it is determined that there are still more pages to parse, then at block 626 the next sequential page of the document is parsed. In parsing the page, any translations that may be necessary for the corresponding printing device are performed.

Figure 11C:
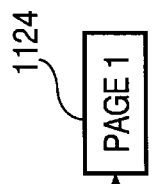
FIG. 11C further illustrates possible values for the set of state parameters shown in FIG. 11A.

At block 627, description(s) of the current page is stored to temporary memory. If the color and BW printing devices use different PDL formats, then two separate descriptions are created. However, if the color and BW printing devices use the same PDL format, then only a single description is created. The particular information that is stored to temporary memory will enable the current page to be correctly printed at a later point in time. At block 628, it is determined whether the current page is a color page or a BW page. If at block 628 it is determined that the current page is a color page, then at block 630 the current color state is set to "COLOR" to indicate the current page is a color page. For example, the CURRENT_COLOR_STATE 1116 variable is set to "COLOR" to indicate the current page is a color page. Control then proceeds to block 633. Conversely, if it is determined that the current page is not a color page, then at block 632 the current color state is set to "BW" to indicate the current page is a BW page. For example, in processing page 414 of print job 400 in FIG. 4, the CURRENT_COLOR_STATE 1116 variable in FIG. 11C is set to "BW" to indicate the current page is a BW page.

At block 633, the printing characteristics of the current page are stored so that they may be later used to ensure the correct printing characteristics are used in printing a subsequent page. For example, in processing page 414 of print job 400 in FIG. 4, the printing characteristics that exist at the end of the page 414 (page 1) are stored in CURRENT_STATE 1118. At block 634, it is determined whether the color of the current page is equal to the color of the previous page. For example, for FIG. 11C, the value of the CURRENT_COLOR_STATE 1118 is compared to the value of the LAST_COLOR_STATE 1108 to determine whether they are equal. If at block 634 it is determined that the color of the current page is not equal to the color of the previous page then control proceeds to block 650.

Alternatively, if at block 634 it is determined that the color of the current page is equal to the color of the previous page, then at block 640, it is determined whether the current page is a color page. If at block 640 it is determined that the current page is not a color page, then control proceeds to block 644. However, if at block 640 it is determined that the current page is a color page, then at block 642 a sequence counter is incremented to keep track of the number of color pages that have been consecutively parsed.

At block 644, a current page counter is incremented to keep track of the total number of pages that have been parsed for the current document. For example, in FIG. 11C, the value of the CURRENT_PAGE 1110 is incremented to keep track of the total number of pages that have been parsed for the current document. At block 646, the previously stored current printing characteristics are stored into a previous printing characteristic structure. For example, in FIG. 11C, the printing characteristics in CURRENT_STATE 1118 are copied into PREV_STATE 1104. In actual implementation, the structures are used to save the printing characteristics and pointers to those structures are stored in the CURRENT_PAGE 1100.

At block 647, the current page is linked into a corresponding linked page list. Thus, if the current page is a BW page, the current page description is linked into a BW linked page list. Alternatively, if the current page is a color page, the current page description is linked into a color linked page list. For example, in FIG. 11C, because page 414 of print job 400 in FIG. 4 is a BW page, the pointer to the BW description of page 414 (page 1) is linked into the BW_LINKED_PAGES 1120 linked list as page 1124. In one embodiment, if the description for the other printing device is produced at block 627, then it may be deleted here to free up memeory.

Figure 11E:
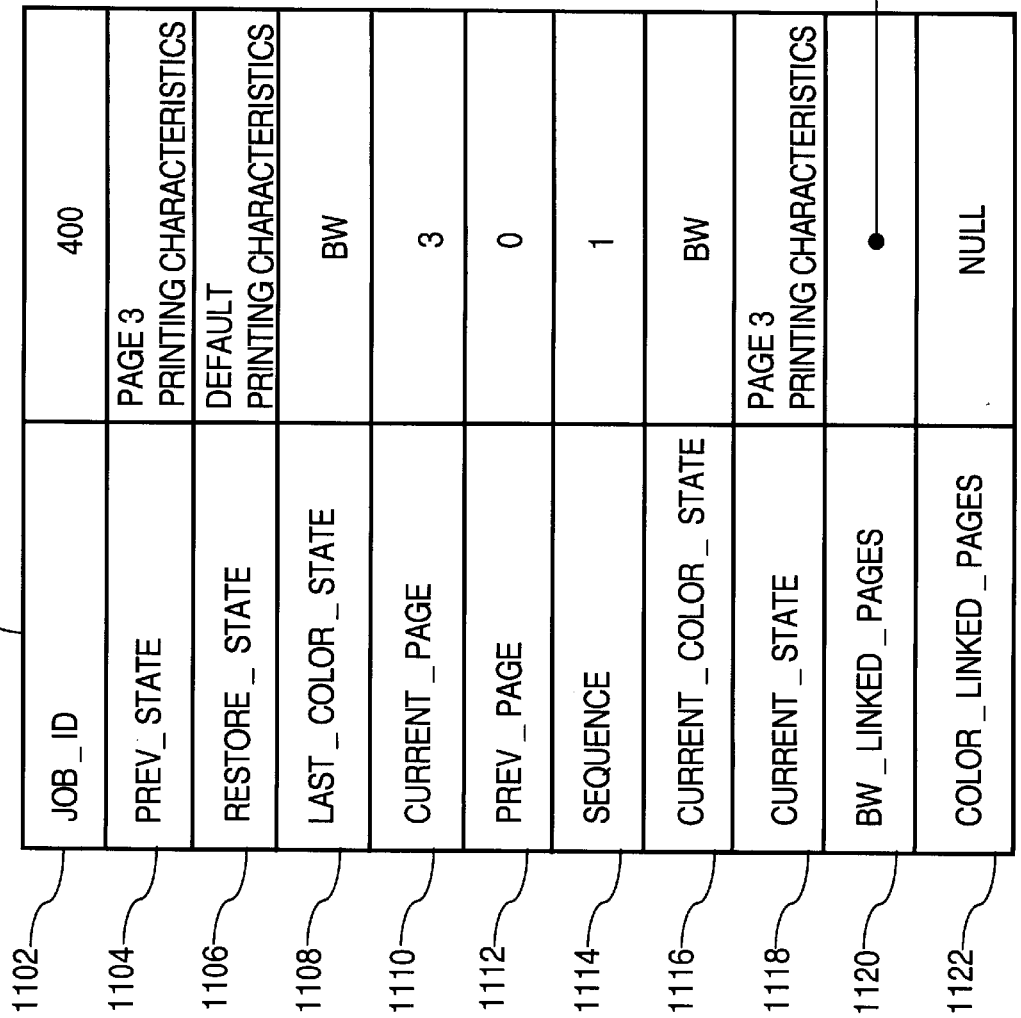
FIG. 11E further illustrates possible values for the set of state parameters shown in FIG. 11A.
Figure 11F:
FIG. 11F further illustrates possible values for the set of state parameters shown in FIG. 11A.
Figure 11H:
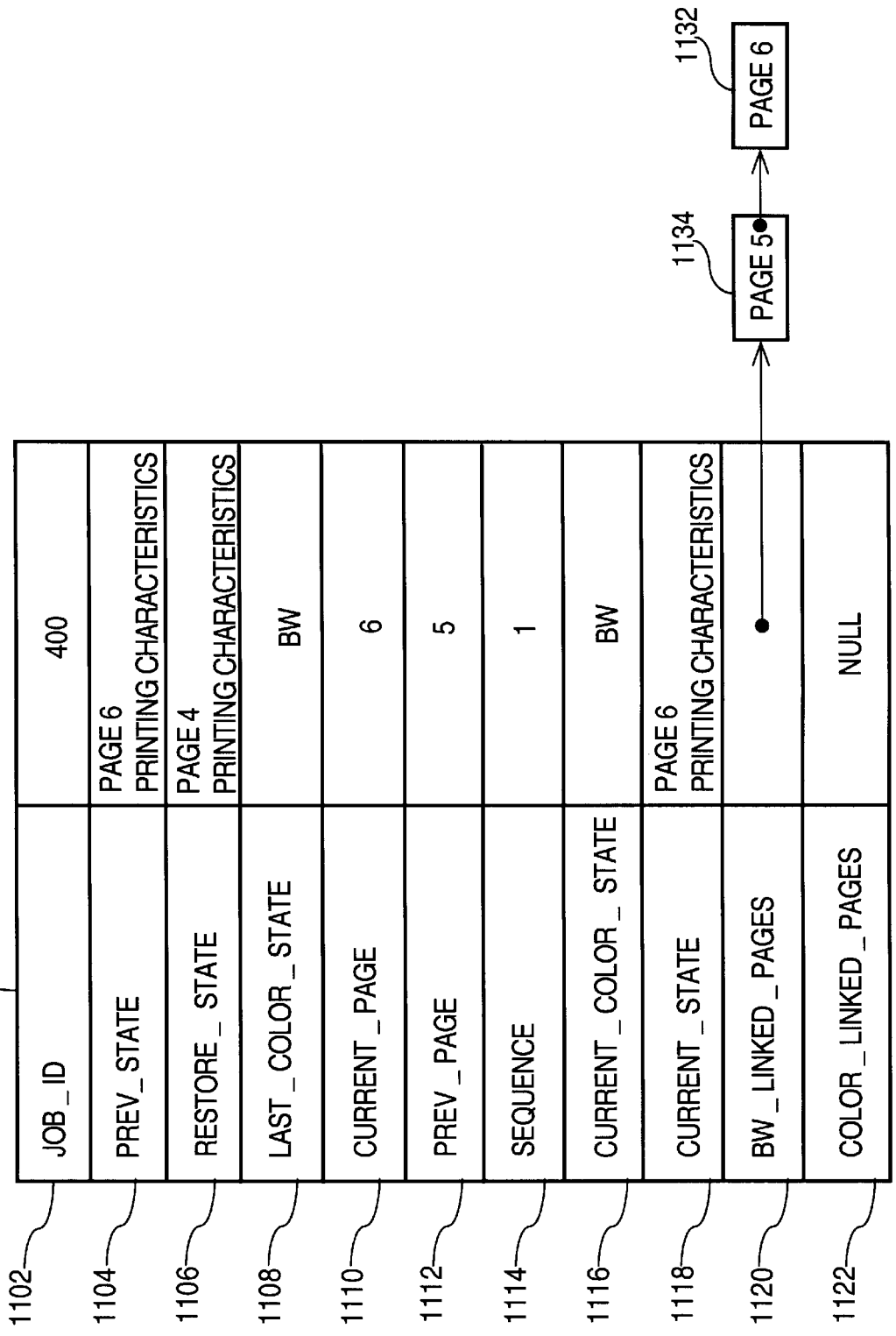
FIG. 11H further illustrates possible values for the set of state parameters shown in FIG. 11A.
Figure 11J:
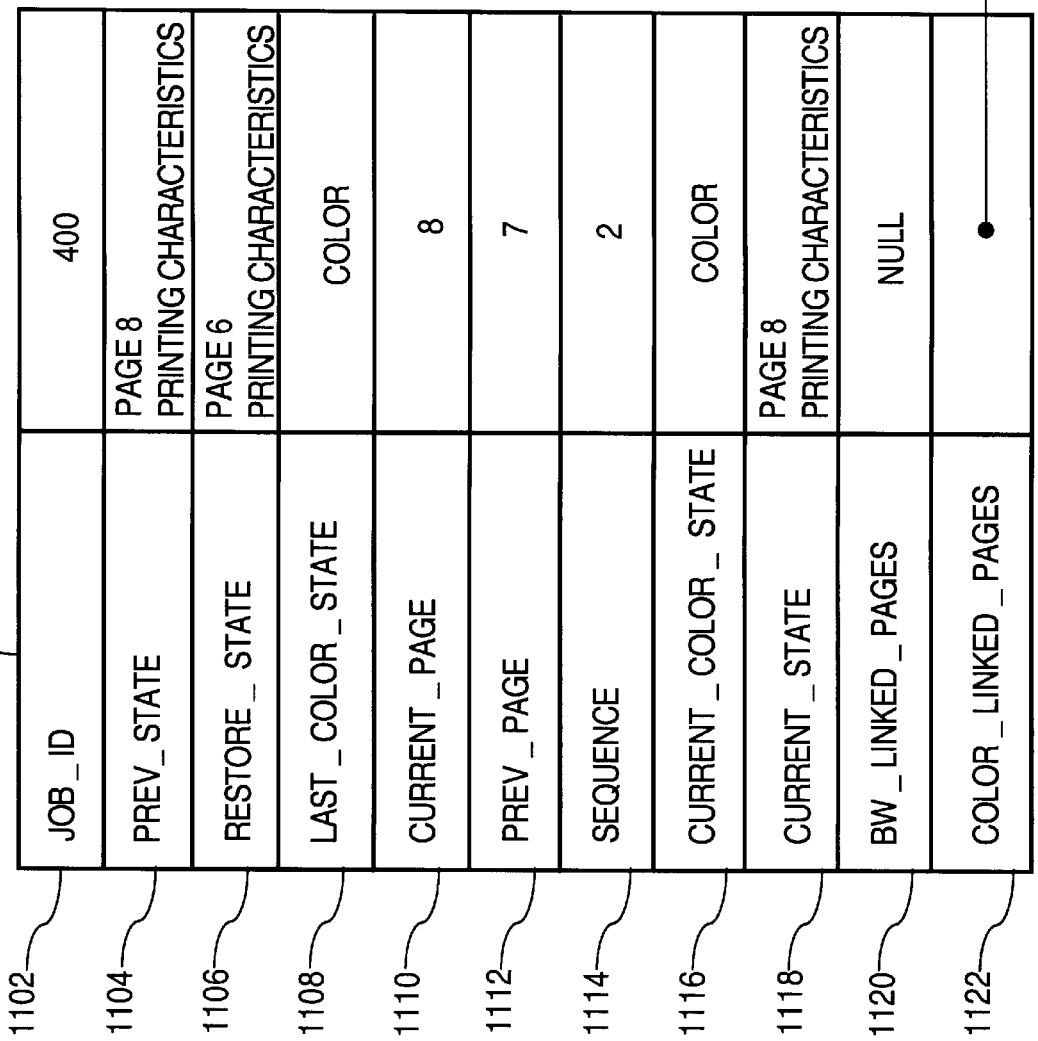
FIG. 11J further illustrates possible values for the set of state parameters shown in FIG. 11A.

FIG. 11C illustrates an example of possible values for state parameters in table 1100 at block 647 after parsing page 414 (page 1) of print job "400" in FIG. 4. As further examples, FIG. 11D illustrates possible values for state parameters in table 1100 at block 647 after parsing page 416 (page 2) of print job "400" in FIG. 4. FIG. 11E illustrates possible values for state parameters in table 1100 at block 647 after parsing page 418 (page 3) of print job "400" in FIG. 4. FIG. 11H illustrates possible values for state parameters in table 1100 at block 647 after parsing page 424 (page 6) of print job "400" in FIG. 4. FIG. 11J illustrates possible values for state parameters in table 1100 at block 647 after parsing page 413 (page 8) of print job "400" in FIG. 4.

Upon completion of block 647, control returns to block 624 (FIG. 6B) to determine whether all pages of the current document have been parsed.

If at block 634 it is determined that the color of the current page is not equal to the color of the previous page then, at block 650, it is determined whether the current page is a BW page. If the current page is not a BW page then control proceeds to block 670. However, if at block 650 it is determined that the current page is a BW page, then at block 654, an identification tag is generated. In one embodiment, the identification tag is generated based on the job ID, the page number of the last page that was sent to a printing device and a sequence number that indicates the number of consecutive color pages that are to be sent to the color printing device. For example, assuming that page 408 (page 4) of print job 400 in FIG. 4 was actually the last page of the document, at block 654, the value of the JOB_ID 1102, the PREV_PAGE 1112 and the SEQUENCE 1114, as shown in FIG. 11F, would be used to generate the identification tag 430.

At block 656, both printing devices are set to an identification tag printing state. The identification tag printing state prepares each printing device for printing an additional page that contains the identification tag.

At block 658, the identification tag is routed to each of the printing devices in order to print additional pages that contain the identification tag. For example, by routing the identification tag to each printing device, the identification tags 430 and 434 are respectively printed on additional pages 406 and 420 as depicted in FIG. 4. At block 660 the color printing device is initialized to the printing characteristics contained in the restore state. This allows the printing characteristics of the previous printed page to be correctly maintained by the color printing device. For example, to print page 408 (page 4) of print job "400" in FIG. 4, the color printing device is set to the printing characteristics that are stored in the RESTORE_STATE 1106 in FIG. 11F.

At block 662, the linked color pages are routed to the color printing device for printing. For example, the page pointer 1130 linked to COLOR_LINKED_PAGES 1122 in FIG. 11F is unlinked and the pointed page is routed to the color printing device.

At block 664 the head of the color linked page list is set to "NULL" to indicate there are no currently linked color pages. At block 666, the current page is linked into the BW linked page list. For example, if the current page is page 422 (page 5) of print job 400 in FIG. 4, the page pointer 1132 to page 422 is linked into the BW_LINKED_PAGES 1120 list as shown in FIG. 11G. Control then proceeds to block 678.

At block 670, the BW printing device is initialized to the printing characteristics contained in the restored state variables. This allows the printing characteristics of the previous printed page to be correctly maintained by the BW printing device. For example, to print pages 422 (page 5) and 424 (page 6) of print job "400" in FIG. 4, the BW printing device is set to the printing characteristics that are stored in the RESTORE_STATE 1106 (printing characteristics of page 4) in FIG. 11H. In this example, by restoring the printing characteristics of "page 4" in the BW printing device, the correct printing characteristics are maintained for each page.

At block 672, the linked BW pages are routed to the BW printing device for printing. For example, the page pointers 1132 and 1134 that are linked to the BW_LINKED_PAGES 1120 in FIG. 11H are unlinked and pages pointed by 1132 and 1134 are routed to the BW printing device. At block 674 the head of the BW linked page list is set to "NULL" to indicate there are no currently linked BW pages.

At block 676, the current page is linked into the color linked page list. For example, if the current page is page 412 (page 7) of print job 400 in FIG. 4, the page pointer 1136 is linked into the COLOR_LINKED$_{13}$ PAGES 1122 list as shown in FIG. 11I. At block 678, the restore state printing characteristics are set equal to the previous state printing characteristics.

At block 680, certain state parameters are updated for parsing another page that is associated with the print request. For example, the LAST_COLOR_STATE 1108 is set equal to the CURRENT_COLOR_STATE 1116; the CURRENT_PAGE 1110 is incremented by one ("1"); the PREV_PAGE 1112 is set equal to the CURRENT_PAGE 1110; and the PREV_STATE is set equal to the CUREENT_STATE 1118.

FIG. 11F illustrates an example of possible values for state parameters in table 1100 at block 680 after parsing page 408 (page 4) of print job "400" in FIG. 4. As further examples, FIG. 11G illustrates possible values for state parameters in table 1100 at block 680 after parsing page 422 (page 5) of print job "400" in FIG. 4. FIG. 11I illustrates possible values for state parameters in table 1100 at block 680 after parsing page 412 (page 7) of print job "400" in FIG. 4.

Upon completion of block 680, control returns to block 622 (FIG. 6B) to reset the sequence counter and determine whether all pages of the current document have been parsed.

Figure 11K:
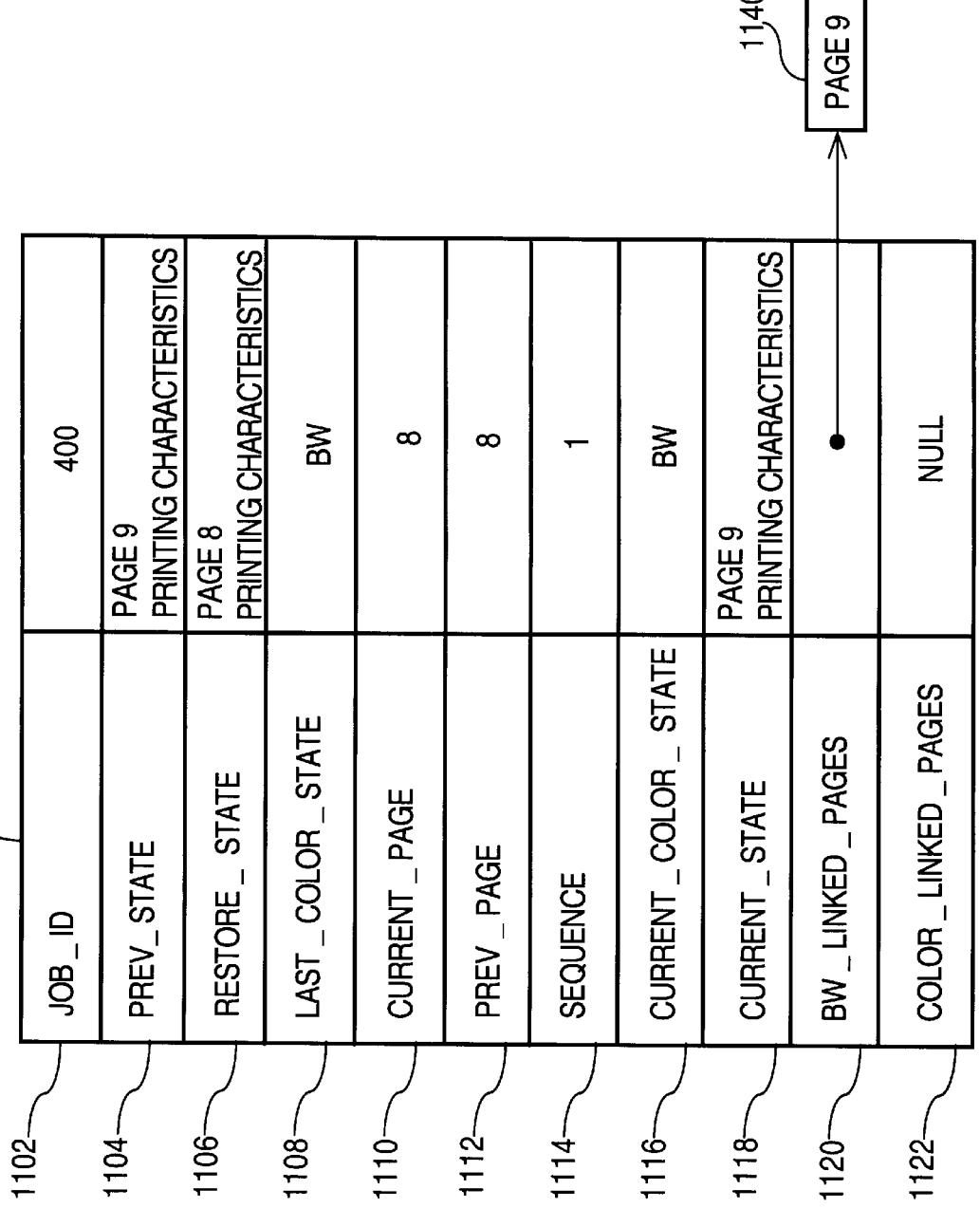
FIG. 11K further illustrates possible values for the set of state parameters shown in FIG. 11A.

At block 648, it is determined whether the current color state is BW. For example, the CURRENT_COLOR_STATE 1116 can be queried to determine whether the current color state is BW. If at block 648 it is determined that the current color state is BW, then at block 682, the BW printing device is initialized to the printing characteristics contained in the restore state. This allows the printing characteristics of the previous printed page to be correctly maintained by the BW printing device. For example, to print page 428 (page 9) of print job "400" in FIG. 4, the BW printing device is set to the printing characteristics that are stored in the RESTORE_STATE 1106 in FIG. 11K. FIG. 11K illustrates an example of possible values for state parameters in table 1100 at block 682 after parsing page 428 (page 9) of print job "400" in FIG. 4. At block 683, the linked BW pages are routed to the BW printing device for printing. For example, the page pointer 1140 linked to BW_LINKED_PAGES 1120 in FIG. 11K is unlinked and the pointed page is routed to the BW printing device.

Alternatively, if at block 648 it is determined that the current color state is not BW, then at block 684, an identification tag is generated. In one embodiment, the identification tag is generated based on the job ID, the page number of the last page that was sent to a printing device and a sequence number that indicates the number of consecutive color pages that are to be sent to the color printing device. For example, if page 408 (page 4) of print job 400 in FIG. 4 is the last page of the document, then at block 684 the values of JOB_ID 1102, PREV_PAGE 1112 and SEQUENCE 1114 as shown in FIG. 11F, are used to generate an identification tag 430.

At block 685, both printing devices are set to an identification tag printing state. The identification tag printing state prepares each printing device for printing an additional page that contains the identification tag.

At block 686, the identification tag is routed to each of the printing devices in order to print additional pages that contain the identification tag. For example, by routing the identification tag to each printing device, the identification tags 430 and 434 are respectively printed on additional pages 406 and 420 as depicted in FIG. 4. At block 687 the color printing device is initialized to the printing characteristics contained in the restore state. This allows the printing characteristics of the previous printed page to be correctly maintained by the color printing device. For example, to print page 408 (page 4) of print job "400" in FIG. 4, the color printing device is set to the printing characteristics that are stored in the RESTORE_STATE 1106 in FIG. 11F.

At block 688, the linked color pages are routed to the color printing device for printing. For example, the page pointer 1130 linked to COLOR_LINKED_PAGES 1122 in FIG. 11F is unlinked and the pointed page routed to the color printing device.

FIG. 6A through FIG. 6G illustrate only an example of a sequence of steps that can be performed for printing pages of a document on different printing devices. Several variations of this sequence of steps can also be used for printing the pages of a document. For example, the step of selecting the printing devices in block 604 may be performed after the step of determining whether the print request requires multiple printing devices.

Also, instead of using a BW and a color linked page list to link consecutive BW and color pages, each page can be immediately routed to a printing device once the corresponding printing device is determined. In certain cases, this can significantly reduce the actual time required to print a particular document. For example, if the color printing device takes significantly longer to print a page than the BW printing device, and the document contains a large number of pages of which a small percentage are color, by sending the color pages directly to the color printer the printing time may be significantly reduced.

Merging Processed Pages of a Document

Figure 7:
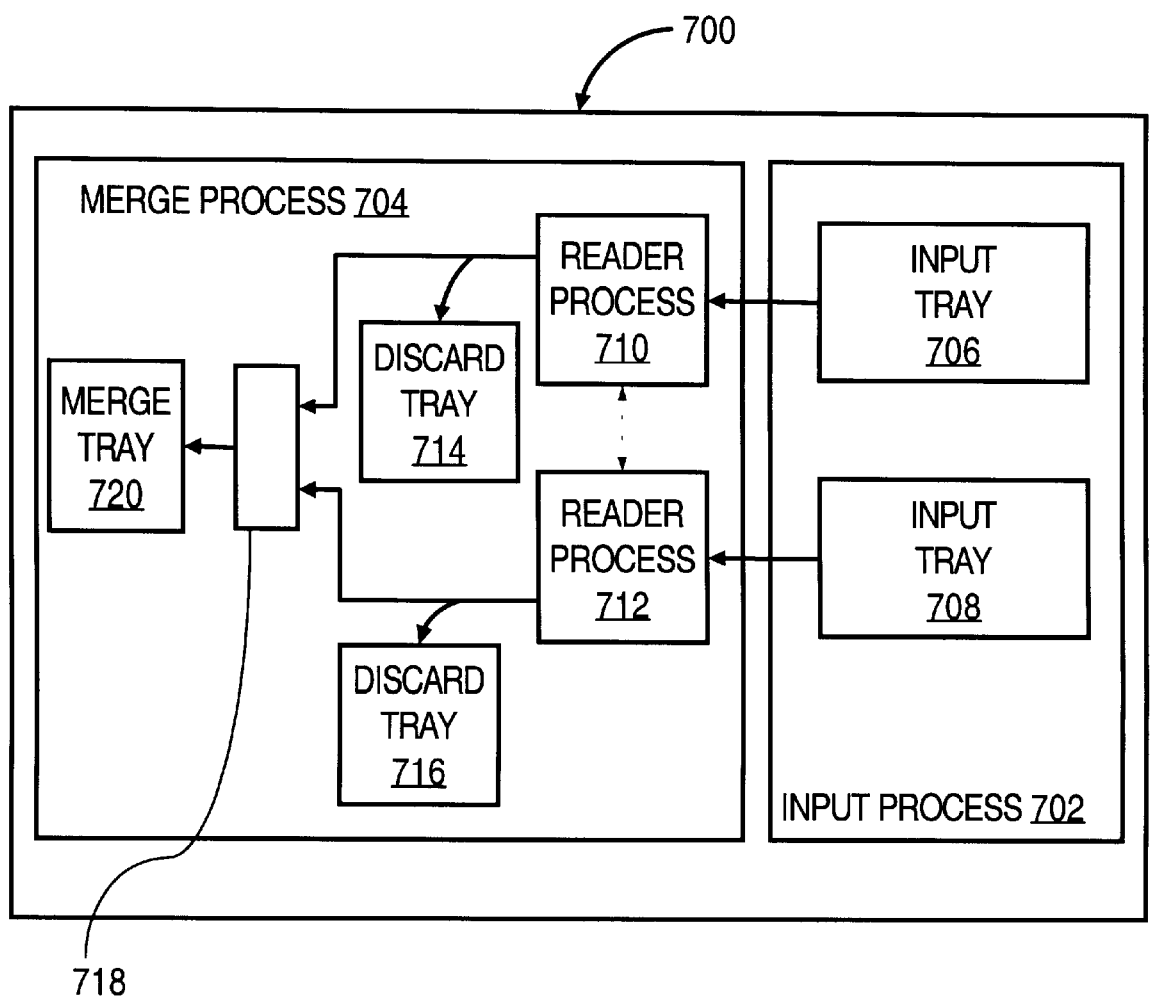
FIG. 7 is a block diagram of a document merging mechanism that can be used to generate a merged document.

Once the pages of the document have been processed or printed ("printed pages") by the selected printing devices, they are merged back into a single document. FIG. 7 is a block diagram of a document merging mechanism 700 that can be used to generate a merged document. The document merging mechanism 700 may form all or a portion of the merge station 114.

Document merging mechanism 700 includes an input process 702 and a merge process 704. The input process 702 includes a plurality of input trays 706, 708 that are used for receiving the pages that were printed on the selected printing devices. For example, a first input tray 706 can be used to receive the pages printed by a black and white printing device and a second input tray 708 can be used to receive the pages printed by a color printing device.

Although input process 702 is depicted as having two input trays 706, 708, two reader processes 710, 712 and two discard trays 714, 716, any number of these components may be used. For example, one embodiment may have a first input tray for black-and-white pages, a second input tray for color pages printed on matte paper, a third input tray for color pages printed on cover stock, and a fourth input tray for black-and-white pages printed on specialty paper, for example, index stock, oversized paper, etc. Further, in certain embodiments the discard trays 714, 716 may be combined so that additional pages are discarded into a single tray.

The merge process 704 includes a plurality of reader processes 710, a plurality of discard trays 714, 716, and a merge tray 720. The merge tray 720 is used to store the merged document. The discard trays 714, 716 are used to store the additional pages that were printed but that are not actually part of the document.

The reader processes 710, 712, respectively receive printed pages from input trays 706, 708. Upon receiving a printed page, the reader processes 710, 712 scan the page to determine whether it is an additional page that contains page-ordering information. If reader process 710, 712 determines that a printed page is an additional page that is not part of the document, the printed page is respectively discarded into discard trays 714, 716. The page-ordering information is then used to determine the next printed page that should be sent to the merge tray 720. In certain embodiments, a buffer 718 is used to ensure the printed pages are delivered in the correct order to the merge tray 720. The reader processes 710, 712 may carry out scanning by using CCD detectors, bar code readers, or other optical scanning devices. What is important is that the reader processes 710, 712 can receive a paper document and obtain the page-ordering information from indicia that is printed on, attached to, or otherwise associated with the page.

In one embodiment, a reader process is selected as the master process and is tasked to synchronize the sending of printed pages to the merge tray 720. In the preferred embodiment, the reader process that receives the printed pages that were printed by the black and white printing device is selected as the master process.

Figure 8:
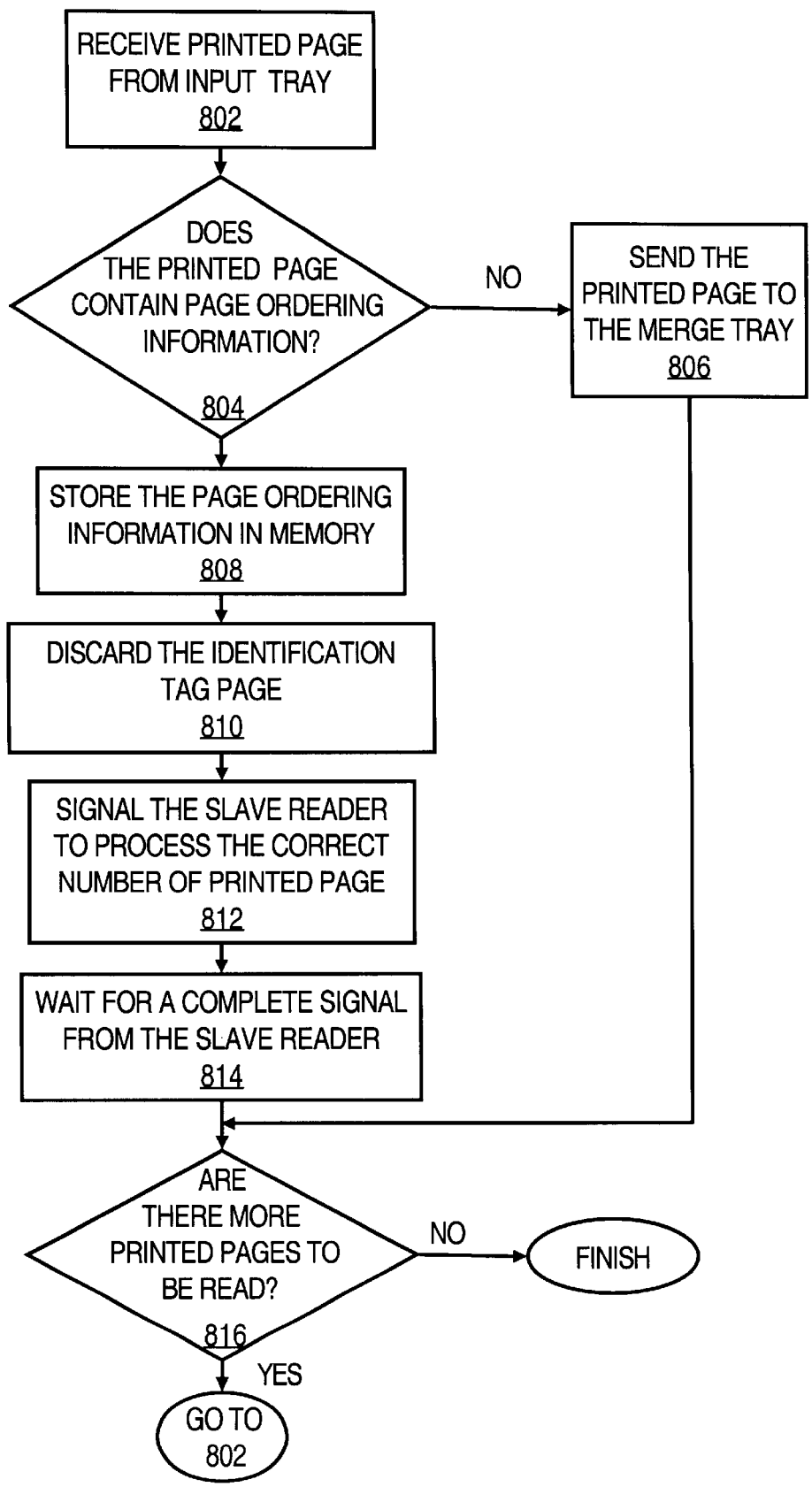
FIG. 8 is a flow diagram that illustrates the processing that is performed by a process for merging the pages of a document.

FIG. 8 is a flow diagram that illustrates processing that is performed by a master reader process for merging the pages of a document. The steps of FIG. 8 are explained with reference to the components of FIG. 7.

Assume that input tray 706 contains printed pages from a black and white printing device and that input tray 708 contains printed pages from a color printing device. Assume further that reader process 710 is the master reader process and that reader process 712 is the slave reader process.

As shown by block 802, the master reader process receives a printed page. For example, reader process 710 receives a printed page from input tray 706. As shown by block 804, the printed page is scanned to determine if it contains page-ordering information. If the printed page does not contain page-ordering information, then as shown by block 806, the printed page is sent to the merge tray. Control then proceeds to block 816.

Alternatively, if the printed page does contain page-ordering information, then as shown by block 808, the master reader process stores the page information in memory. As shown by block 810, the printed page with the identification tag is discarded into the discard tray. For example, reader process 710 causes the printed page to be discarded into discard tray 714.

As shown by block 812, the master reader process communicates with the slave process to cause it to process a particular number of printed pages of the document. In one embodiment, the master reader process sends the page-ordering information to the slave reader process. The slave reader process then uses the received page-ordering information to verify that the printed pages it processes correlate to the printed pages that the master reader process has instructed the slave reader process to process. For example, if the page-ordering information contains a sequence number equal to "400", a first page position identifier equal to "4", and a following pages identifier equal to "1", the slave reader process is instructed to process a single printed page that is page "4" of document "400".

As shown by block 814, the master reader process waits for the slave reader process to indicate that it has processed the requested number of pages. As shown by block 816, once the slave process indicates it has processed the requested number of pages, the master reader process determines if there are more pages to be read for the printed document. If there are more pages to read, then control proceeds to block 802 to read the next printed page.

Figure 9:
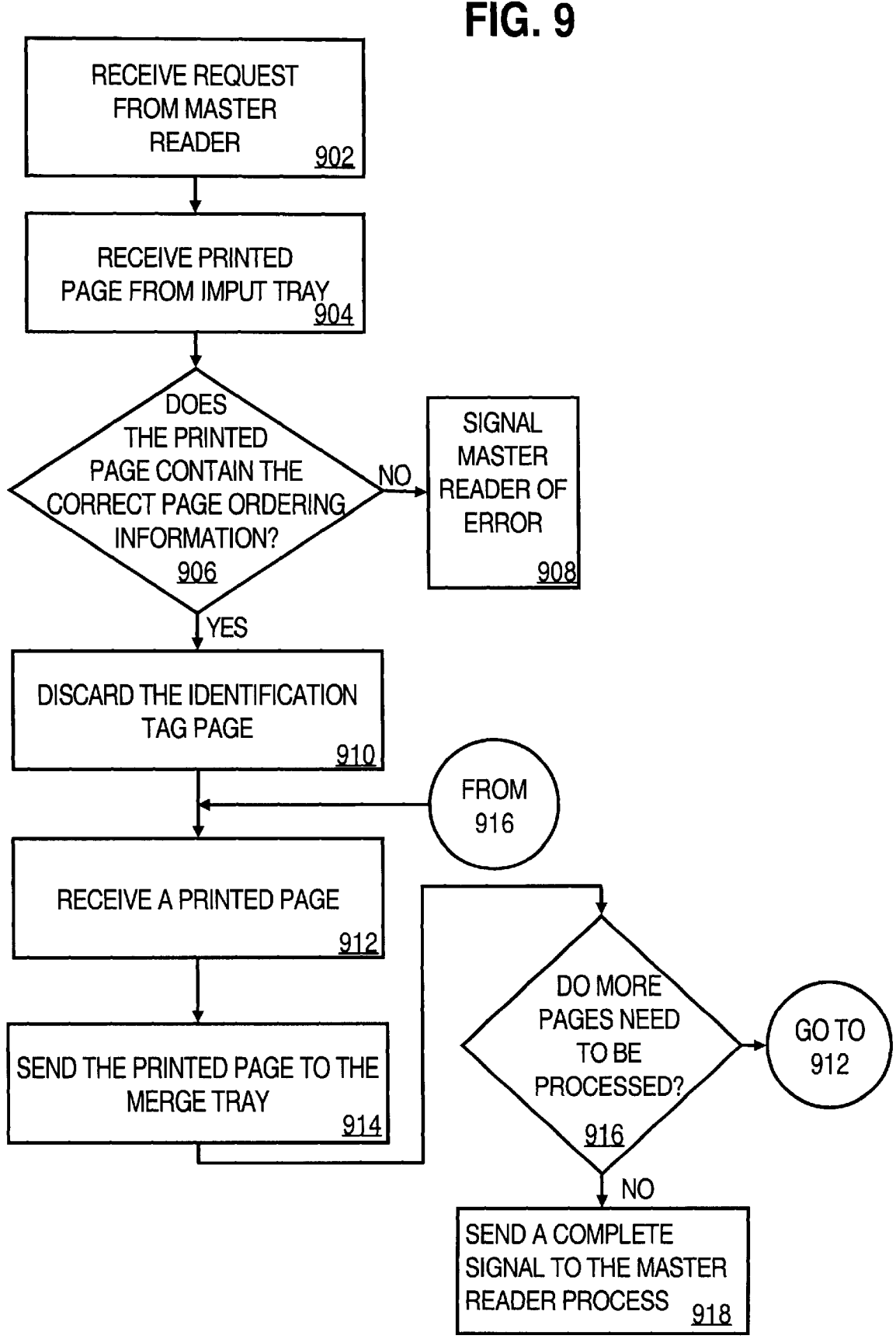
FIG. 9 is a flow diagram that illustrates a process for merging the pages of a document.

FIG. 9 is a flow diagram that illustrates processing by a master slave process for merging the pages of a document. The steps of FIG. 9 are explained with reference to the components of FIG. 7. It shall be assumed that input tray 706 contains printed pages from a black and white printing device and that input tray 708 contains printed pages from a color printing device. It is also assumed that reader process 710 is the master reader process and that reader process 712 is the slave reader process.

As shown in block 902, the slave reader process receives a request from a master reader process to process a particular number of printed pages for a particular document. For example, a request from reader process 710 may contain page-ordering information that includes a sequence number equal to "400", a first page position identifier equal to "4", and a following pages identifier equal to "1".

A printed page is received by the slave reader process, as indicated by block 902. For example, reader process 712 receives a printed page from input tray 708. As shown by block 906, the printed page is scanned to determine if it contains the correct page-ordering information. If the process determines that the printed page does not contain the correct page-ordering information, then as shown by block 908, the slave reader process signals the master reader process that pages are out of order.

Conversely, if the printed page does contain the correct page-ordering information, then as shown by block 910, the printed page is discarded into the discard tray. For example, reader process 712 causes the printed page to be discarded into discard tray 716.

As shown by block 912, a printed page is received by the slave reader process. For example, reader process 712 receives a printed page from input tray 708. The printed page is sent to the merge tray, as indicated in block 914. As shown by block 916, based on the page-ordering information, the slave reader process determines if more pages need to be read from the input tray. If the slave reader determines that more pages do need to be read, then control proceeds to block 912 to read the next printed page.

Alternatively, if the slave reader determines that the required number of printed pages have been read, then control proceeds to block 918 to signal the master reader that processing is complete.

Although the examples provided have illustrated the processing of pages based on whether a particular page contains a token or command that indicating it is a color page, the invention is not limited to the processing of pages based on any particular type of token or command. For example, the pages of a document can be scanned to determine if they contain a particular character or a character from a particular character set. If the page contains the particular character or a character from the particular character set, then it is routed to a first printing device. Alternatively, if the page does not contain the particular character or a character from the particular character set, then it is routed to a second printing device.

Hardware Overview

Figure 10:
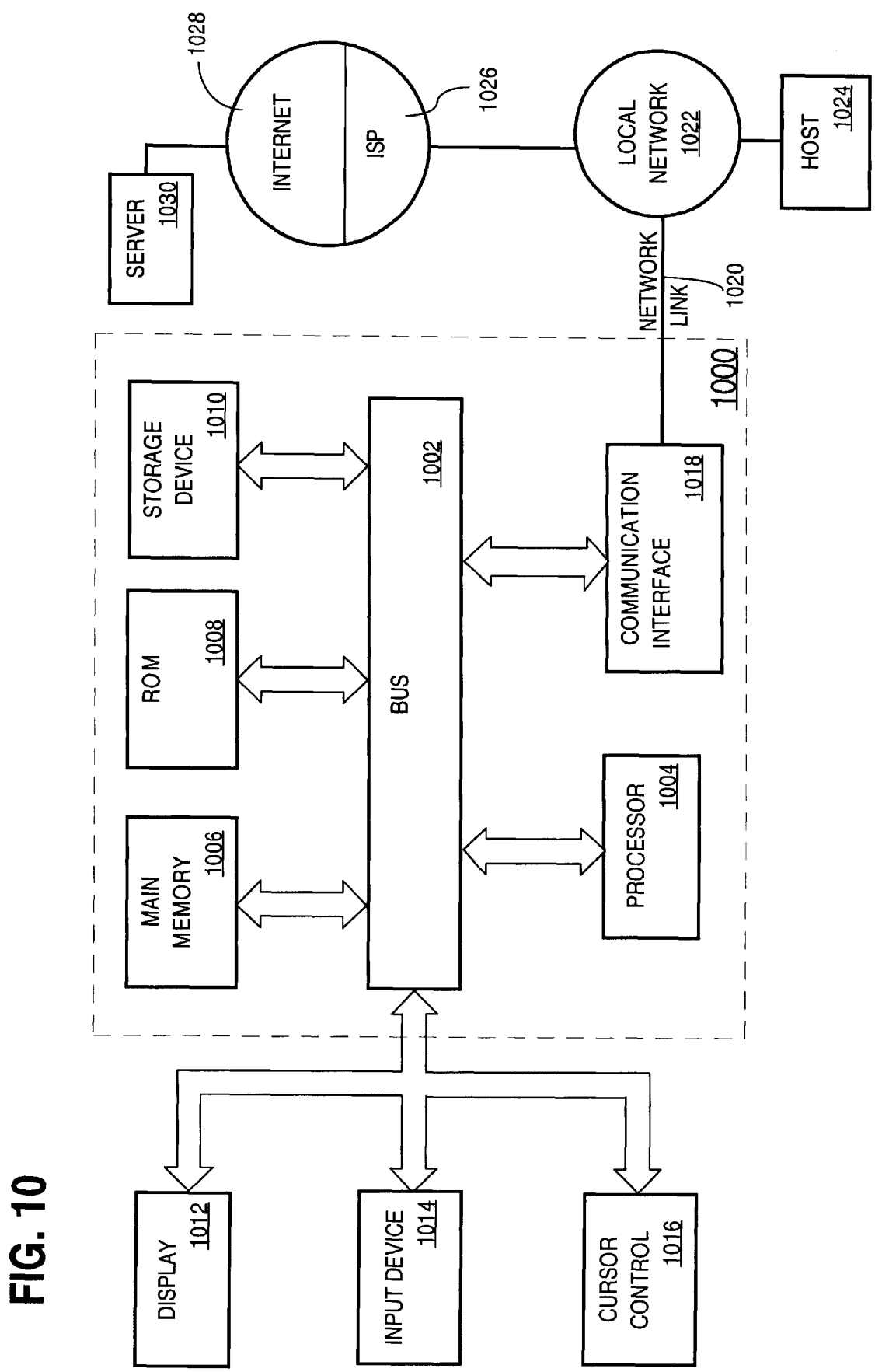
FIG. 10 is a block diagram of a computer system hardware arrangement that can be used to implement the invention.

FIG. 10 is a block diagram that illustrates a computer system 1000 upon which the control station of embodiments of the invention may be implemented.

Computer system 1000 includes a bus 1002 or other communication mechanism for communicating information, and a processor 1004 coupled with bus 1002 for processing information. Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to bus 1002 for storing static information and instructions for processor 1004. A storage device 1010, such as a magnetic disk or optical disk, is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

The invention is related to the use of computer system 1000 for processing the pages of a document. According to one embodiment of the invention, the processing of pages of a document is provided by computer system 1000 in response to processor 1004 executing one or more sequences of one or more instructions contained in main memory 1006. Such instructions may be read into main memory 1006 from another computer-readable medium, such as storage device 1010. Execution of the sequences of instructions contained in main memory 1006 causes processor 1004 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1004 for execution. Such a medium may take many forms, including but not limited to, non-volatile media, volatile media, and transmission media. Non-volatile media includes, for example, optical or magnetic disks, such as storage device 1010. Volatile media includes dynamic memory, such as main memory 1006. Transmission media includes coaxial cables, copper wire and fiber optics, including the wires that comprise bus 1002. Transmission media can also take the form of acoustic or light waves, such as those generated during radio wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1004 for execution. For example, the instructions may initially be carried on a magnetic disk of a remote computer. The remote computer can load the instructions into its dynamic memory and send the instructions over a telephone line using a modem. A modem local to computer system 1000 can receive the data on the telephone line and use an infrared transmitter to convert the data to an infrared signal. An infrared detector can receive the data carried in the infrared signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are exemplary forms of carrier waves transporting the information.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. In accordance with the invention, one such downloaded application provides for processing the pages of a document as described herein.

The received code may be executed by processor 1004 as it is received, and/or stored in storage device 1010, or other non-volatile storage for later execution. In this manner, computer system 1000 may obtain application code in the form of a carrier wave.

Modifications and Changes

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for printing an electronic document that comprises a first set of pages having a first characteristic and a second set of pages having a second characteristic, the method comprising:

identifying the first set of pages and the second set of pages within the electronic document based on contents of the electronic document;

selecting first and second output devices that are respectively compatible with the first and second characteristics;

removing, from the first set of pages that is to be sent to the second output device, one or more PDL commands that causes printing, so that the first set of pages will be printed by only the first output device;

routing each page in the first set of pages and the second sets of pages to both the first output device and the second output device, respectively, based on such identification and selection;

generating identifying data that specifies a relative position of each page in the first set of pages within the electronic document;

providing the identifying data to the first output device; and after the first and second sets of pages have been output, providing the identifying data to a merge station to allow the merge station to automatically merge the first and second sets of pages into a merged document by processing the identifying data.

2. A method for printing an electronic document that comprises a first set of pages having a first characteristic and a second set of pages having a second characteristic, the method comprising:

identifying the first set of pages and the second set of pages within the electronic document based on contents of the electronic document;

storing, in association with one or more of the first pages, one or more current page printing characteristics that are associated with one of the first pages in the electronic document;

storing, in association with a current page among the first pages, one or more current page printing characteristics that are associated with the current page in the electronic document and that identify printing characteristics that are in effect at the end of the current page;

selecting first and second output devices that are respectively compatible with the first and second characteristics;

removing, from the first set of pages that is to be sent to the second output device, one or more PDL commands that causes printing, so that the first set of pages will be printed by only the first output device;

routing the first and second sets of pages to the first and second output devices, respectively, based on such identification and selection;

generating identifying data that specifies a relative position of each page in the first set of pages within the electronic document;

providing the identifying data to the first output device; and after the first and second sets of pages have been output, providing the identifying data to a merge station to allow the merge station to automatically merge the first and second sets of pages into a merged document by processing the identifying data.

3. A method for printing an electronic document that comprises a first set of pages having a first characteristic and a second set of pages having a second characteristic, the method comprising:

identifying the first set of pages and the second set of pages within the electronic document based on contents of the electronic document;

selecting first and second output devices that are respectively compatible with the first and second characteristics;

routing the first and second sets of pages to the first and second output devices, respectively, based on such identification and selection;

generating identifying data that specifies a relative position of each page in the first set of pages within the electronic document;

providing the identifying data to the first output device; and after the first and second sets of pages have been output, providing the identifying data to a merge station to allow the merge station to automatically merge the first and second sets of pages into a merged document by temporarily storing the first set of pages in a buffer while the second set of pages is being output; and merging the first and second sets of pages when the second set of pages have been output.

4. A method for printing an electronic document that comprises a first set of pages having a first characteristic and a second set of pages having a second characteristic, the method comprising:

identifying the first set of pages and the second set of pages within the electronic document based on contents of the electronic document;

selecting first and second output devices that are respectively compatible with the first and second characteristics;

routing the first and second sets of pages to the first and second output devices, respectively, based on such identification and selection;

generating identifying data that specifies a relative position of each page in the first set of pages within the electronic document;

providing the identifying data to the first output device; and after the first and second sets of pages have been output, providing the identifying data to a merge station to allow the merge station to automatically merge the first and second sets of pages into a merged document by testing whether a previous page is identifier page; and sending a current page to a merge station for merging when the previous page is an identifier age.

5. A computer-readable medium carrying one or more sequences of instructions for printing an electronic document that comprises a first set of pages and a second set of pages, in which the first set of pages has a first characteristic and the second set of pages has a second characteristic, wherein execution of the one or more sequences of instructions by one or more processors causes the one or more processors to perform the steps of:

identifying the first set of pages and the second set of pages within the electronic document based on contents of the electronic document;

selecting first and second output devices that are respectively compatible with the first and second characteristics;

removing, from the first set of pages that is to be sent to the second output device, one or more PDL commands that causes printing, so that the first set of pages will be printed by only the first output device;

routing each page in the first set of pages and the second sets of pages to both the first output device and the second output device, respectively, based on such identification and selection;

generating identifying data that specifies a relative position of each page in the first set of pages within the electronic document;

providing the identifying data to the first output device; and after the first and second sets of pages have been output, providing the identifying data to a merge station to allow the merge station to automatically merge the first and second sets of pages into a merged document by processing the identifying data.

6. A computer-readable medium carrying one or more sequences of instructions for printing an electronic document that comprises a first set of pages and a second set of pages, in which the first set of pages has a first characteristic and the second set of pages has a second characteristic, wherein execution of the one or more sequences of instructions by one or more processors causes the one or more processors to perform the steps of:

identifying the first set of pages and the second set of pages within the electronic document based on contents of the electronic document;

storing, in association with one or more of the first pages, one or more current page printing characteristics that are associated with one of the first pages in the electronic document;

storing, in association with a current page among the first pages, one or more current page printing characteristics that are associated with the current page in the electronic document and that identify printing characteristics that are in effect at the end of the current page;

selecting first and second output devices that are respectively compatible with the first and second characteristics;

removing, from the first set of pages that is to be sent to the second output device, one or more PDL commands that causes printing, so that the first set of pages will be printed by only the first output device;

routing the first and second sets of pages to the first and second output devices, respectively, based on such identification and selection;

generating identifying data that specifies a relative position of each page in the first set of pages within the electronic document;

providing the identifying data to the first output device; and after the first and second sets of pages have been output, providing the identifying data to a merge station to allow the merge station to automatically merge the first and second sets of pages into a merged document by processing the identifying data.

7. A computer-readable medium carrying one or more sequences of instructions for printing an electronic document that comprises a first set of pages and a second set of pages, in which the first set of pages has a first characteristic and the second set of pages has a second characteristic, wherein execution of the one or more sequences of instructions by one or more processors causes the one or more processors to perform the steps of:

identifying the first set of pages and the second set of pages within the electronic document based on contents of the electronic document;

selecting first and second output devices that are respectively compatible with the first and second characteristics;

routing the first and second sets of pages to the first and second output devices, respectively, based on such identification and selection;

generating identifying data that specifies a relative position of each page in the first set of pages within the electronic document;

providing the identifying data to the first output device; and after the first and second sets of pages have been output, providing the identifying data to a merge station to allow the merge station to automatically merge the first and second sets of pages into a merged document by temporarily storing the first set of pages in a buffer while the second set of pages is being output; and merging the first and second sets of pages when the second set of pages have been output.

8. A computer-readable medium carrying one or more sequences of instructions for printing an electronic document that comprises a first set of pages and a second set of pages, in which the first set of pages has a first characteristic and the second set of pages has a second characteristic, wherein execution of the one or more sequences of instructions by one or more processors causes the one or more processors to perform the steps of:

identifying the first set of pages and the second set of pages within the electronic document based on contents of the electronic document;

selecting first and second output devices that are respectively compatible with the first and second characteristics;

routing the first and second sets of pages to the first and second output devices, respectively, based on such identification and selection;

generating identifying data that specifies a relative position of each page in the first set of pages within the electronic document;

providing the identifying data to the first output device; and after the first and second sets of pages have been output, providing the identifying data to a merge station to allow the merge station to automatically merge the first and second sets of pages into a merged document by testing whether a previous page is identifier page; and sending a current page to a merge station for merging when the previous page is an identifier page.

9. A computer system for printing an electronic document that comprises a first set of pages and a second set of pages, in which the first set of pages has a first characteristic and the second set of pages has a second characteristic, the computer system comprising a memory containing one or more sequences of instructions which, when executed by one or more processors, causes the one or more processors to perform the steps of:

identifying the first set of pages and the second set of pages within the electronic document based on contents of the electronic document;

selecting first and second output devices that are respectively compatible with the first and second characteristics;

removing, from the first set of pages that is to be sent to the second output device, one or more PDL commands that causes printing, so that the first set of pages will be printed by only the first output device;

routing each page in the first set of pages and the second sets of pages to both the first output device and the second output device, respectively, based on such identification and selection;

generating identifying data that specifies a relative position of each page in the first set of pages within the electronic document;

providing the identifying data to the first output device; and after the first and second sets of pages have been output, providing the identifying data to a merge station to allow the merge station to automatically merge the first and second sets of pages into a merged document by processing the identifying data.

10. A computer system for printing an electronic document that comprises a first set of pages and a second set of pages, in which the first set of pages has a first characteristic and the second set of pages has a second characteristic, the computer system comprising a memory containing one or more sequences of instructions which, when executed by one or more processors, causes the one or more processors to perform the steps of:

identifying the first set of pages and the second set of pages within the electronic document based on contents of the electronic document;

storing, in association with one or more of the first pages, one or more current page printing characteristics that are associated with one of the first pages in the electronic document;

storing, in association with a current page among the first pages, one or more current page printing characteristics that are associated with the current page in the electronic document and that identify printing characteristics that are in effect at the end of the current page;

selecting first and second output devices that are respectively compatible with the first and second characteristics;

removing, from the first set of pages that is to be sent to the second output devices, one or more PDL commands that causes printing, so that the first set of pages will be printed by only the first output device;

routing the first and second sets of pages to the first and second output devices, respectively, based on such identification and selection;

generating identifying data that specifies a relative position of each page in the first set of pages within the electronic document;

providing the identifying data to the first output device; and after the first and second sets of pages have been output, providing the identifying data to a merge station to allow the merge station to automatically merge the first and second sets of pages into a merged document by processing the identifying data.

11. A computer system for printing an electronic document that comprises a first set of pages and a second set of pages, in which the first set of pages has a first characteristic and the second set of pages has a second characteristic, the computer system comprising a memory containing one or more sequences of instructions which, when executed by one or more processors, causes the one or more processors to perform the steps of:

identifying the first set of pages and the second set of pages within the electronic document based on contents of the electronic document;

selecting first and second output devices that are respectively compatible with the first and second characteristics;

routing the first and second sets of pages to the first and second output devices, respectively, based on such identification and selection;

generating identifying data that specifies a relative position of each page in the first set of pages within the electronic document;

providing the identifying data to the first output device; and after the first and second sets of pages have been output, providing the identifying data to a merge station to allow the merge station to automatically merge the first and second sets of pages into a merged document by temporarily storing the first set of pages in a buffer while the second set of pages is being output; and merging the first and second sets of pages when the second set of pages have been output.

12. A computer system for printing an electronic document that comprises a first set of pages and a second set of pages, in which the first set of pages has a first characteristic and the second set of pages has a second characteristic, the computer system comprising a memory containing one or more sequences of instructions which, when executed by one or more processors, causes the one or more processors to perform the steps of:

identifying the first set of pages and the second set of pages within the electronic document based on contents of the electronic document;

selecting first and second output devices that are respectively compatible with the first and second characteristics;

routing the first and second sets of pages to the first and second output devices, respectively, based on such identification and selection;

generating identifying data that specifies a relative position of each page in the first set of pages within the electronic document;

providing the identifying data to the first output device; and after the first and second sets of pages have been output, providing the identifying data to a merge station to allow the merge station to automatically merge the first and second sets of pages into a merged document by testing whether a previous page is identifier page; and sending a current page to a merge station for merging when the previous page is an identifier page.

* * * * *